(12) United States Patent
Matsugami et al.

(10) Patent No.: US 11,543,989 B2
(45) Date of Patent: Jan. 3, 2023

(54) STORAGE SYSTEM AND CONTROL METHOD THEREOF

(71) Applicant: Hitachi, Ltd., Tokyo (JP)

(72) Inventors: Kazuki Matsugami, Tokyo (JP); Tomohiro Kawaguchi, Tokyo (JP); Akira Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/208,129

(22) Filed: Mar. 22, 2021

(65) Prior Publication Data

US 2021/0278989 A1 Sep. 9, 2021

Related U.S. Application Data

(63) Continuation of application No. 17/007,119, filed on Aug. 31, 2020, now Pat. No. 10,969,985.

(30) Foreign Application Priority Data

Mar. 4, 2020 (JP) ................ JP2020-36790

(51) Int. Cl.
*G06F 12/02* (2006.01)
*G06F 3/06* (2006.01)

(52) U.S. Cl.
CPC .......... *G06F 3/0649* (2013.01); *G06F 3/0607* (2013.01); *G06F 3/0635* (2013.01); *G06F 3/0683* (2013.01)

(58) Field of Classification Search
CPC .... G06F 3/0607; G06F 3/0635; G06F 3/0647; G06F 3/0649; G06F 3/0683
See application file for complete search history.

(56) References Cited

U.S. PATENT DOCUMENTS 8,495,325 B2  7/2013  Yamamoto et al.
2009/0240880 A1  9/2009  Kawaguchi

FOREIGN PATENT DOCUMENTS

JP 2009-230742 A 10/2009

*Primary Examiner* — Yong J Choe
(74) *Attorney, Agent, or Firm* — Mattingly & Malur, PC

(57) ABSTRACT

In a case of exchanging a migration source storage controller and a migration destination storage controller sharing one storage medium during replacement of storage devices, when hardware configurations or data management forms of the storage controllers are different, data in the storage medium cannot be shared even when data management information can be copied. Accordingly, a storage system, having a storage control unit and a storage drive provided with a storage medium, includes data management information for accessing data in the storage drive. A first storage control unit copies data management information about the data in the storage drive to a second storage control unit. When a write request is received from a host after copying of the data management information begins, each of the first storage and second storage control units stores write data related to the write request in a separate storage area of the storage drive.

12 Claims, 16 Drawing Sheets

FIG. 4
MANAGEMENT INFORMATION ARRANGEMENT TABLE

| MANAGEMENT INFORMATION NAME | LOGICAL MEMORY ID | LOGICAL ADDRESS | SIZE |
|---|---|---|---|
| SECURITY SETTING INFORMATION | 1 | 0x1000 | 0x1000 |
| BACKUP CONTROL INFORMATION | 1 | 0x3000 | 0x2000 |
| CHARGING INFORMATION | 1 | 0x8000 | 0x0100 |
| ... | ... | ... | ... |

FIG. 5
MANAGEMENT INFORMATION ARRANGEMENT CONVERSION TABLE

| LOGICAL MEMORY ID (A) | LOGICAL ADDRESS (A) | SIZE (A) | LOGICAL MEMORY ID (B) | LOGICAL ADDRESS (B) | SIZE (B) |
|---|---|---|---|---|---|
| 1 | 0x1000 | 0x1000 | 2 | 0x2000 | 0x2000 |
| 1 | 0x3000 | 0x2000 | 2 | 0x4000 | 0x2000 |
| 1 | 0x8000 | 0x0100 | 2 | 0x9000 | 0x0500 |
| ... | ... | ... | ... | ... | ... |

FIG. 6
MANAGEMENT INFORMATION CONVERSION TABLE

| MANAGEMENT INFORMATION NAME | ENTRY SIZE (A) | ENTRY INFORMATION (A) | ENTRY SIZE (B) | ENTRY INFORMATION (B) |
|---|---|---|---|---|
| SECURITY SETTING INFORMATION | 1Byte | 0x00<br>0x01<br>0x10 | 2Byte | 0x0000<br>0x00FF<br>0xFF00 |
| BACKUP CONTROL INFORMATION | 4Byte | 0x00000000<br>0xFFFFFFFF | 4Byte | 0x00000000<br>0xFFFFFFFF |
| CHARGING INFORMATION | 1Byte | 0x00<br>0xFF | 1Byte | 0x00<br>0xFF |
| ... | ... | ... | ... | ... |

FIG. 7

LOGICAL-PHYSICAL ADDRESS CONVERSION TABLE

| LOGICAL MEMORY ID | LOGICAL ADDRESS | STORAGE ID | PHYSICAL MEMORY ID | PHYSICAL ADDRESS |
|---|---|---|---|---|
| 1 | 0x10001000 | 1 | 3 | 0xF0005000 |
| 1 | 0x10002000 | 2 | 4 | 0xF0005000 |
| 1 | 0x10008000 | 3 | 2 | 0xF0008000 |
| ... | ... | ... | ... | ... |

FIG. 8

LOGICAL VOLUME MANAGEMENT TABLE

| LOGICAL VOLUME ID | CACHE ALLOCATION VOLUME | LOGICAL VOLUME ADDRESS | CACHE ID (A) | CACHE ID (B) | DRIVE ID | DRIVE ADDRESS |
|---|---|---|---|---|---|---|
| 1 | 500MB | 0x11000 | 3 | NO | 5 | 0x2000 |
| 2 | 100MB | 0x10000 | NO | 7 | 3 | 0x3000 |
| ... | ... | ... | ... | ... | ... | ... |

FIG. 9

CACHE MANAGEMENT TABLE

| CACHE ID | PHYSICAL MEMORY ID | PHYSICAL ADDRESS | USAGE FLAG | USAGE STARTING TIME POINT | FINAL ACCESS TIME POINT | DIRTY DATA FLAG | CACHE HIT COUNT |
|---|---|---|---|---|---|---|---|
| 1 | 1 | 0x0000 | ON | 10:00:00 | 12:00:00 | ON | 40 |
| 1 | 1 | 0x4000 | OFF | 00:00:00 | 00:00:00 | OFF | 0 |
| 1 | 2 | 0x2000 | ON | 09:59:59 | 10:00:00 | OFF | 70 |
| ... | ... | ... | ... | ... | ... | ... | ... |

FIG. 10
POOL ALLOCATION MANAGEMENT TABLE

| VOL ID (101) | VOL ATTRIBUTE (102) | VOL CAPACITY (103) | POOL ID (104) | RAID GROUP ID (105) |
|---|---|---|---|---|
| 0 | THIN PROVISIONING | 100GB | 0 | 0 |
| 1 | COMPRESSION VALID | 200GB | 0 | 1 |
| 2 | NORMAL VOL | 500GB | 1 | 2 |
| 3 | COMPRESSION VALID (DIFFERENCE MANAGEMENT) | 200GB | 1 | 2 |
| ... | ... | ... | ... | ... |

(213)

FIG. 11
DRIVE ALLOCATION MANAGEMENT TABLE

| RAID GROUP ID (111) | RAID LEVEL (112) | DRIVE ID (113) | DRIVE TYPE (114) | CAPACITY (115) | USED CAPACITY (116) |
|---|---|---|---|---|---|
| 0 | RAID5 | 0<br>1<br>2<br>3 | SSD | 5TB | 4TB |
| 1 | RAID5 | 4<br>5<br>6<br>7 | HDD | 5TB | 1TB |
| ... | ... | ... | ... | ... | ... |

(214)

FIG. 12
HIERARCHY LOGICAL-PHYSICAL ADDRESS CONVERSION TABLE

| LOGICAL MEMORY ID (121) | LOGICAL ADDRESS (122) | DIFFERENCE BIT (123) | PHYSICAL MEMORY ID (124) | PHYSICAL ADDRESS (125) | SIZE (126) |
|---|---|---|---|---|---|
| 1 | 0xF0001000 | 0 | 3 | 0x5000 | 8KB |
| 1 | 0xF0002000 | 0 | 4 | 0x5000 | 4KB |
| 1 | 0xF0008000 | 1 | 2 | 0x8000 | 1KB |
| ... | ... | ... | ... | ... | ... |

REPLACEMENT PROGRESS MANAGEMENT POINTER TABLE

| MANAGEMENT INFORMATION NAME | LOGICAL ADDRESS HEAD | SIZE | PROGRESS POINTER |
|---|---|---|---|
| SECURITY SETTING INFORMATION | 0x1000 | 0x1000 | 0x1000 |
| BACKUP CONTROL INFORMATION | 0x3000 | 0x2000 | 0x3000 |
| CHARGING INFORMATION | 0x8000 | 0x0100 | 0x8000 |
| LOGICAL-PHYSICAL ADDRESS CONVERSION TABLE | 0x10001000 | 0x00FFEEEE | 0x00F00000 |
| HIERARCHY LOGICAL-PHYSICAL ADDRESS CONVERSION TABLE | 0xF0001000 | 0x00FFEEEE | 0xF0001000 |
| ... | ... | ... | ... |

STORAGE SYSTEM AND CONTROL METHOD THEREOF

CLAIM OF PRIORITY

The present application claims priority from Japanese patent application JP 2020-36790 filed on Mar. 4, 2020, the content of which is hereby incorporated by reference into this application.

BACKGROUND OF THE INVENTION

1. Field of the Invention

The present invention relates to a storage system.

2. Description of the Related Art

A storage system generally includes one or more storage devices. Each of the one or more storage devices generally includes a hard disk drive (HDD), a solid state drive (SSD), or the like as a storage medium. The storage system is accessed from one or a plurality of upper level devices (for example, a host computer) via a network such as a storage area network (SAN) and a local area network (LAN). Generally, reliability of the storage devices is improved by using a high reliability method according to a redundant array of independent (or inexpensive) disks (RAID) technique.

In the storage devices constituting the storage system, a lifetime of the devices is generally defined based on durability years of components, and replacement is required at a cycle corresponding to the lifetime. During replacement of a storage device, data stored in the storage device is migrated to another storage device to be exchanged. A non-disruptive migration technique in which access from an upper level device is not stopped has been widely spread as a method for migrating data between storage devices. US Patent Application Publication No. 2013/8495325 (Patent Literature 1) discloses a data migration method in which data is migrated between a migration source storage device and a migration destination storage device without stopping access between a host computer and a storage system. According to Patent Literature 1, an access path between the host computer and the migration destination storage device is set, and then a state of the access path is set to be available. When the access path between the host computer and the migration destination storage device is available, data is migrated from the migration source storage device to the migration destination storage device. However, since an update of host I/O or the like needs to be reflected on both the migration source and the migration destination during replacement so as to cope with a failure during the replacement, there is a problem that performance is influenced in a long term when a volume of data to be migrated is large. In addition, since storage media having the same capacity are required between storage devices to be exchanged, a storage medium that is added to a migration source after addition is performed and has a remaining component lifetime cannot be reused.

Compared with the storage system described above in which each storage device includes a storage medium, JP-A-2009-230742 (Patent Literature 2) discloses a data storage method in a storage system connected to one or more external storage media provided outside in addition to a storage medium provided in each of a plurality of storage devices. In the storage system, the external storage media are shared among the storage devices. Patent Literature 2 discloses a configuration in which a logical volume defined in a storage device is paired with a logical volume in another storage device. In such a configuration, a method for storing data managed by each of the paired logical volumes as a single piece of data in an external storage medium is implemented by sharing data storage area allocation information among the storage devices.

By combining the non-disruptive migration technique described above and the technique of sharing the external storage media among the storage devices, replacement can be executed at a cycle suitable for each of a storage controller and a storage medium that constitute a storage device, a volume of data to be migrated between storage devices can be reduced, and a period during which performance is influenced accompanying with the replacement can be shortened.

However, a storage array generally includes two or more storage controllers, and data redundancy is executed among the storage controllers. Therefore, if storage devices to be exchanged have the same hardware configuration and the same data management form, replacement can be executed by copying migration source information such as configuration information and logical-physical address mapping information to a storage device to be exchanged. However, this is limited to a case in which the storage devices to be exchanged have the same hardware configuration and the same data management form. When replacing a storage device, a hardware configuration and a data management form of a storage device after exchange are generally different from those before the exchange. Therefore, a configuration such as a volume of a migration source storage device needs to be reconstructed in accordance with a format of a migration destination storage device.

In order to share a storage medium among storage devices, logical-physical address mapping which is correspondence information between a physical address indicating a data storage position and a logical address needs to be transferred to a migration destination storage device, and information received in a migration destination storage needs to be converted into a processable format. When there is a change in I/O from an upper level device to a migration source or a migration destination or a configuration change during replacement, the change needs to be reflected on both the migration source and the migration destination.

SUMMARY OF THE INVENTION

The invention relates to a method for implementing a non-disruptive migration between storage devices.

A representative example of the invention disclosed in the present application is as follows. A storage system includes a storage control unit provided with a processor and a memory, and a storage drive provided with a storage medium that stores data. The storage control unit includes data management information for accessing data stored in the storage drive. The storage control unit includes a first storage control unit and a second storage control unit. The first storage control unit and the second storage control unit are connected to a host and the storage drive. The first storage control unit copies the data management information about the data stored in the storage drive from the first storage control unit to the second storage control unit. When the storage control unit receives a write request from the host after the copying of the data management information is started, each of the first storage control unit and the second storage control unit stores write data related to the write request in a separate storage area of the storage drive.

According to an aspect of the invention, a non-disruptive migration can be executed while an external storage medium is shared between storage devices, replacement can be executed at a cycle suitable for each of a storage controller and a storage medium that constitute a storage device, and a performance influence accompanying with the replacement can be prevented. Problems, configurations, and effects other than those described above will become apparent from the following description of embodiments.

BRIEF DESCRIPTION OF THE DRAWINGS

FIG. 4 is a diagram showing a configuration example of a management information arrangement table held by the storage device according to the first embodiment of the invention.

FIG. 5 is a diagram showing a configuration example of a management information arrangement conversion table held by the storage device according to the first embodiment of the invention.

FIG. 6 is a diagram showing a configuration example of a management information conversion table held by the storage device according to the first embodiment of the invention.

FIG. 7 is a diagram showing a configuration example of a logical-physical address conversion table held by the storage device according to the first embodiment of the invention.

FIG. 8 is a diagram showing a configuration example of a logical volume management table held by the storage device according to the first embodiment of the invention.

FIG. 9 is a diagram showing a configuration example of a cache management table held by the storage device according to the first embodiment of the invention.

FIG. 10 is a diagram showing a configuration example of a pool allocation management table held by the storage device according to the first embodiment of the invention.

FIG. 11 is a diagram showing a configuration example of a drive allocation management table held by the storage device according to the first embodiment of the invention.

FIG. 12 is a diagram showing a configuration example of a hierarchy logical-physical address conversion table held by the storage device according to the first embodiment of the invention.

FIG. 13 is a diagram showing a configuration example of a replacement progress management pointer table held by the storage device according to the first embodiment of the invention.

DESCRIPTION OF THE PREFERRED EMBODIMENTS

Figure 1:
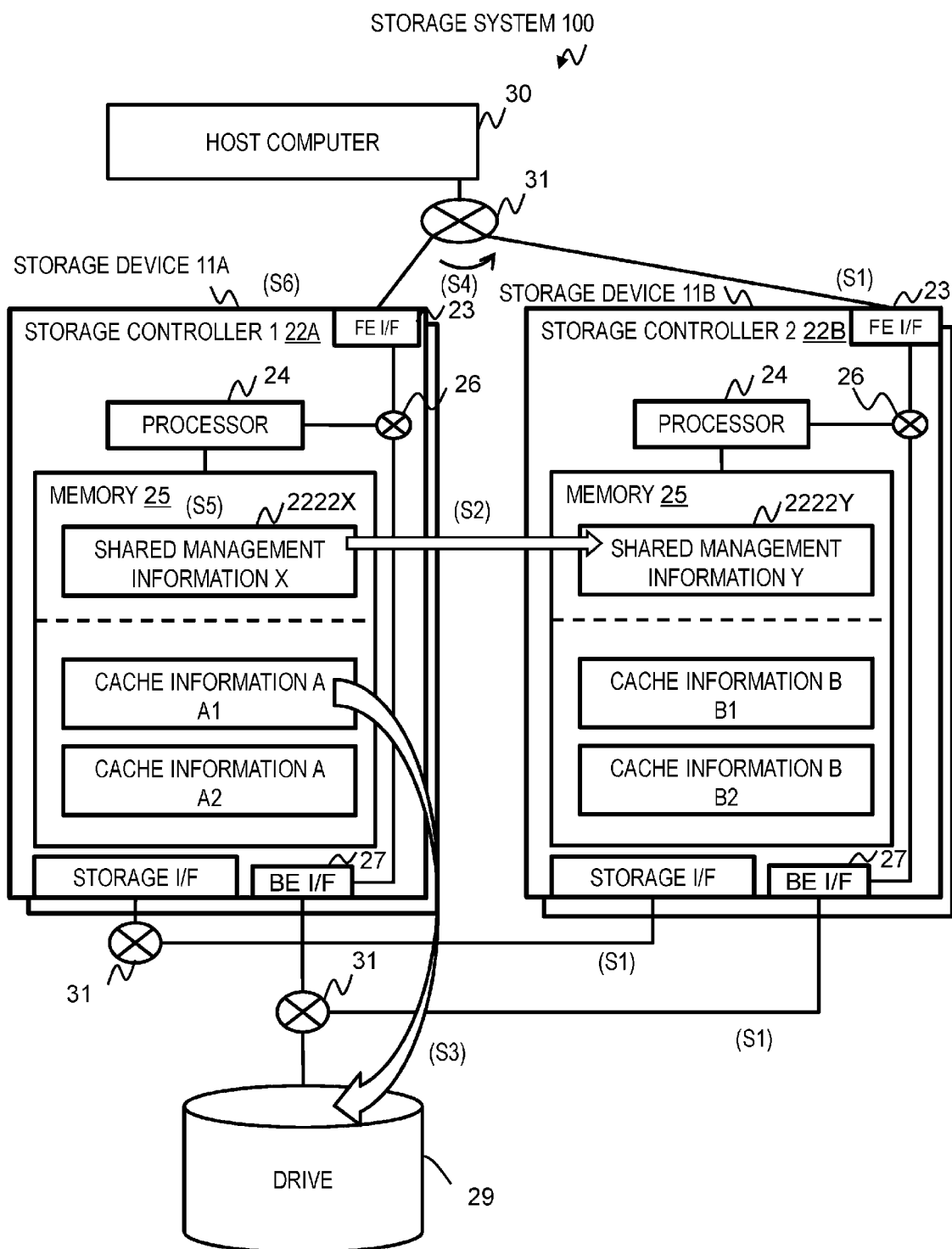
FIG. 1 is a diagram showing a replacement procedure between storage devices having different data management forms, which is executed by a storage system according to a first embodiment of the invention.

Hereinafter, embodiments of the invention will be described with reference to the drawings. In the accompanying drawings, elements having the same functions may be denoted by the same reference number. The accompanying drawings show specific embodiments and examples consistent with a principle of the invention. The embodiments and examples are for the purpose of understanding the invention and are not intended to limit the invention.

As will be described later, the embodiments of the invention may be implemented by software running on a general-purpose computer, may be implemented by dedicated hardware, or may be implemented by a combination of software and hardware.

Hereinafter, processings in the embodiments of the invention may be described with a "program" serving as a subject (a subject of an operation). Since the program is executed by a processor and a predetermined processing is executed using a memory or a communication port (a communication control device), a subject of description may be a processor. A part of or the entire program may be implemented by dedicated hardware, or may be modularized. Various programs may be installed in computers by a program distribution server or a storage medium.

In the following description, an "interface unit" may include at least one of a user interface unit and a communication interface unit. The user interface unit may include at least one I/O device among one or more I/O devices (for example, an input device such as a keyboard and a pointing device, and an output device such as a display device) and a display calculator. The communication interface unit may include one or more communication interface devices. The one or more communication interface devices may be one or more communication interface devices of the same type (for example, one or more network interface cards (NIC)), or may be two or more communication interface devices of different types (for example, an NIC and a host bus adapter (HBA)).

A "memory unit" includes one or more memories in the following description. The at least one memory may be a volatile memory or a non-volatile memory. The memory unit is mainly used in a processing executed by a processor unit.

The "processor unit" includes one or more processors in the following description. The at least one processor is typically a central processing unit (CPU).

In the following description, although information is described in an expression of an "xxx table", information may be described in any data structure. That is, the "xxx table" can be referred to as "xxx information" in order to indicate that the information does not depend on a data structure. In the following description, a configuration of each table is an example, one table may be divided into two or more tables, and all or a part of two or more tables may be one table.

In the following description, a common reference numeral among reference numerals may be used when elements of the same type are described without distinction, and a reference numeral (or an element ID such as an identification number) may be used when the elements of the same type are described with distinction. For example, when a plurality of storage controllers are described without distinction, the storage controllers are described as "storage controllers 22", and when the storage controllers are described with distinction, the storage controllers are described as a "storage controller 1_22A" and a "storage controller 2_22B". The same applies to other elements (for example, a cache area 203, a buffer area 202, an address 1100, and the like).

A "storage system" includes one or more storage devices in the following description. The at least one storage device may be a general-purpose physical computer. The at least one storage device may be a virtual storage device, and may execute software-defined anything (SDx). For example, a software-defined storage (SDS) (an example of the virtual storage device) or a software-defined datacenter (SDDS) can be adopted as the SDx.

Hereinafter, embodiments of the invention will be described with reference to the drawings.

First Embodiment

Hereinafter, a first embodiment of the invention will be described.
(Replacement Procedure Between Storage Devices Having Different Data Management Form)

FIG. 1 is a diagram showing a replacement procedure between storage devices having different data management forms, which is executed by a storage system 100 according to the first embodiment of the invention.

The storage system 100 includes a host computer 30, a storage device 11, and a drive 29. The host computer 30 is connected to the storage device 11 via a network 31 and is managed by a management computer (not shown). The storage device 11 includes two or more storage controllers 22 therein, and each of the storage controllers 22 includes one or more memories 25 therein. The memory 25 records shared management information X2222X related to one or more logical units having a plurality of logical storage areas, and provides a logical unit to the host computer 30. The shared management information X2222X includes security setting information, backup control information, charging information, a logical-physical address conversion table, and a hierarchy logical-physical address conversion table to be described later. The host computer 30 may be a physical computer or a virtual computer executed by a physical computer. The host computer 30 may be a virtual computer executed in the storage system 100. The host computer 30 may be an external system that is not provided in the storage system.

The present embodiment shows a case in which the storage system 100 migrates the shared management information X2222X related to a logical unit from a storage device 11A to a storage device 11B.

A specific example is as follows.

(S1) In the storage system 100, the storage device 11B serving as a migration destination is connected to the storage controller 1_22A serving as a migration source, the host computer 30, and the drive 29 via the network 31. Each connection path is not validated at the time of connection.

(S2) A mutual connection between the storage controller 1_22A and the storage controller 2_22B is confirmed through a storage I/F 28. Paths from the management computer to the storage controllers 22 and a path from the management computer to the drive 29 are validated for both of the storage controllers 22. At the same time, a logical unit to be migrated is specified, so that the shared management information X2222X which is management information of the logical unit is transferred between the storage controllers 22. During the transfer, the shared management information X2222X transferred from the storage controller 1_22A to the storage controller 2_22B is converted into shared management information Y2222Y via a processor 24 of the storage controller 2_22B, and is recorded in the memory 25. When there is a configuration change or a change in the shared management information X2222X caused by host I/O from the host computer 30, the above-described conversion is performed on a change difference, and then the change difference needs to be reflected in the shared management information Y2222Y of the storage controller 2_22B.

(S3) In addition to data related to replacement, data written by the host I/O during the replacement needs to be referable from both the migration source and the migration destination on an assumption that the replacement is interrupted due to a failure or the like. The storage controller 1_22A temporarily stores the data written by the host I/O from the host computer 30 as cache information A in the memory 25. In order to refer to the cache information A from the storage controller 2_22B, the storage controller 2_22B needs to share allocation information of all pieces of the cache information A stored in the memory 25 of the storage controller 1_22A. In the first embodiment, the cache information A is stored in the drive 29 in synchronization with the host I/O, so that the cache information A can be referred to in the drive 29 from both the storage controller 1_22A and the storage controller 2_22B.

(S4) The shared management information Y2222Y is recorded in the storage controller 2_22B, so that the storage controller 2_22B can receive the host I/O from the host computer 30 to a logical unit. Therefore, a path to the host computer 30 connected via the network 31 is validated, and a target of the host I/O is switched to the storage controller 2_22B. When recording of the shared management information Y2222Y is completed, a processing in which the storage controller 1_22A stores the data written by the host I/O in the drive 29 is switched to a processing in which (i) the data written by the host I/O is made redundant as the redundant cache information A of the storage controller 1_22A and redundant cache information B of the storage controller 2_22B and (ii) writing to the drive 29 is made asynchronous with the host I/O, so that response performance is improved.

(S5) After the target of the host I/O is switched from the storage controller 1_22A, it is confirmed whether the shared management information X2222X and the cache information A have differences not reflected in the storage controller 2_22B and the drive 29. After confirming that there is no difference, the shared management information X2222X which is management information related to a logical unit and the cache information A are deleted. Accordingly, a migration of the logical unit from the storage controller 1_22A to the storage controller 2_22B is completed. An addition of the storage controller 22 and a movement of the logical unit can be implemented by the procedures up to (S5).

(S6) The migration source storage controller 1_22A is removed from the storage system 100, and the replacement from the storage controller 1_22A to the storage controller 2_22B is completed.

Each of the migration source storage device 11A and the migration destination storage device 11B may include a plurality of storage controllers 22. In the following description, for example, each of a plurality of storage controllers 1_22A provided in the migration source storage device 11A may be described as a storage controller 1_22A1 and a storage controller 1_22A2. In this case, cache information may be replicated in the memories 25 of the plurality of storage controllers 22. For example, the processor 24 of the migration source storage controller 1_22A1 may be described as a processor 24A1 (see FIG. 18).

(Storage Device)

Figure 2:
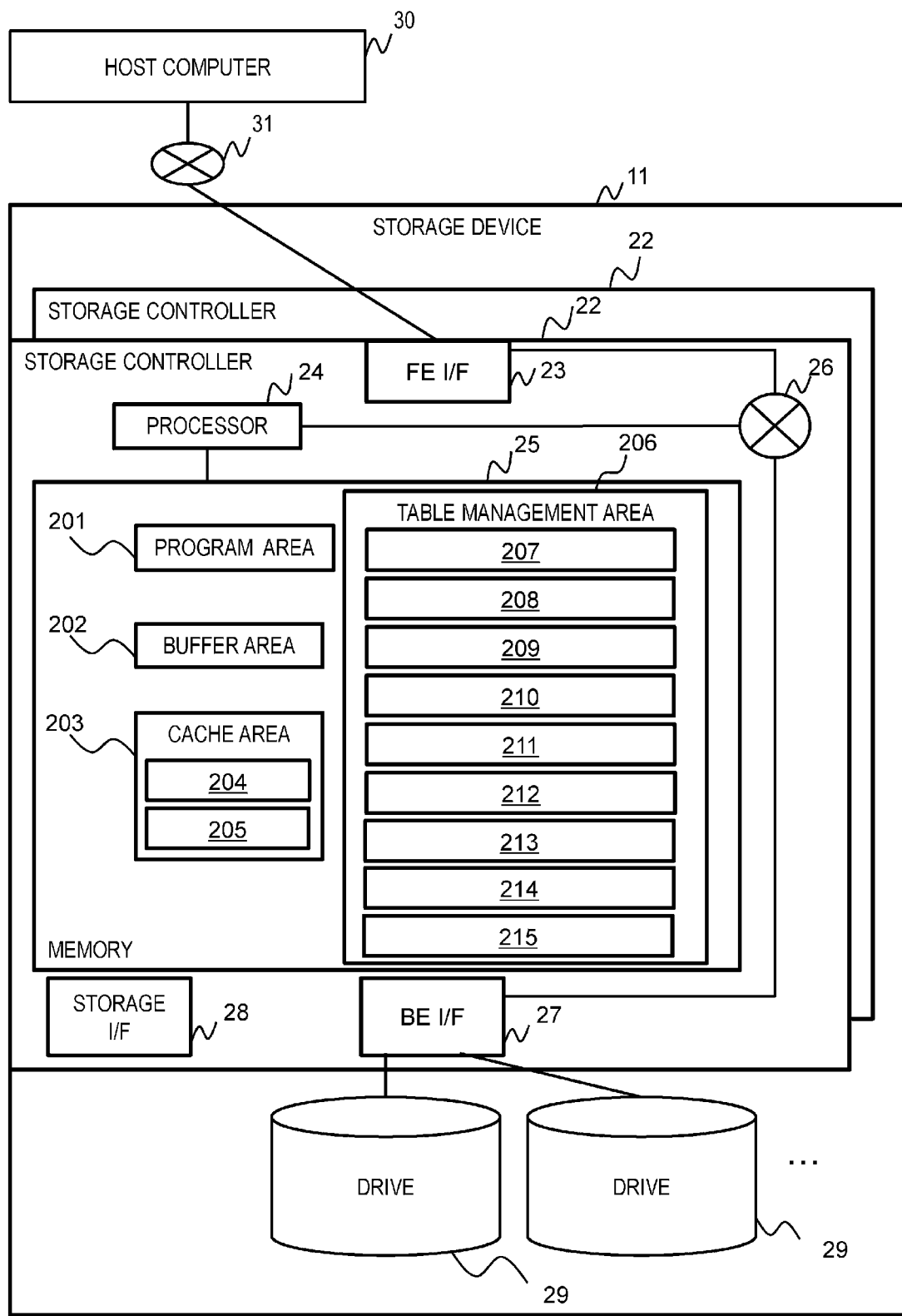
FIG. 2 is a block diagram showing a configuration of a storage device according to the first embodiment of the invention.

FIG. 2 is a block diagram showing a configuration of the storage device 11 according to the first embodiment of the invention.

The storage device 11 includes one or more storage controllers 22 and various drives 29 connected to the one or more storage controllers 22.

The storage controller 22 includes a front-end interface device (FE_I/F) 23 that communicates with the host computer 30, the storage interface device (storage I/F) 28 that performs communication between storage devices, the processor 24 that controls an entire device, the memory 25 that stores a program and information used by the processor 24, a back-end interface device (BE_I/F) 27 that communicates with the drive 29, and an internal network 26 that connects components described above.

The memory 25 includes a program area 201 for managing a program, the buffer area 202 which is a temporary storage area when data is transferred and copied, the cache area 203 for temporarily storing write data (data written in response to a write command) from the host computer 30 and read data (data read in response to a read command) from the drive 29, and a table management area 206 for storing various tables.

The drive 29 is a device including a non-volatile data storage medium, and may include a plurality of types of drives having different performances. The drive 29 is formed of a hard disk drive having an interface such as a fibre channel (FC), a non-volatile memory express (NVMe), a serial attached SCSI (SAS), and a serial advanced technology attachment (SATA), a solid state drive (SSD) having an I/O throughput performance and an I/O response performance better than those of a hard disk drive, or the like.

The SSD is a semiconductor storage medium including a plurality of flash memories and an SSD controller that controls the plurality of flash memories. An appearance shape or the like of the SSD is not limited to a form factor. In addition, a non-volatile semiconductor memory such as a NOR or a NAND may be used as the flash memory. Instead of the flash memory, various semiconductor memories such as a magnetoresistive random access memory (MRAM) which is a magnetoresistive memory, a resistance random access memory (ReRAM) which is a resistance change memory, and a ferroelectric random access memory (Fe-RAM) which is a ferroelectric memory may be used.

The FE_I/F 23, the BE_I/F 27, and the storage I/F 28 are examples of an interface unit. The memory 25 is an example of a memory unit. The processor 24 is an example of a processor unit.

FIG. 2 shows a configuration common to the migration source and the migration destination. For example, when the migration source is the storage controller 1_22A and the migration destination is the storage controller 2_22B as shown in FIG. 1, constituent elements of the storage controller 1_22A and the storage controller 2_22B may be distinguished by "A" and "B" or the like in a similar manner. For example, the cache area 203 of the migration source storage controller 1_22A may be described as a cache area 203A, and the cache area 203 of the migration destination storage controller 2_22B may be described as a cache area 203B (see FIGS. 21 and 22).

(Memory)

Figure 3:
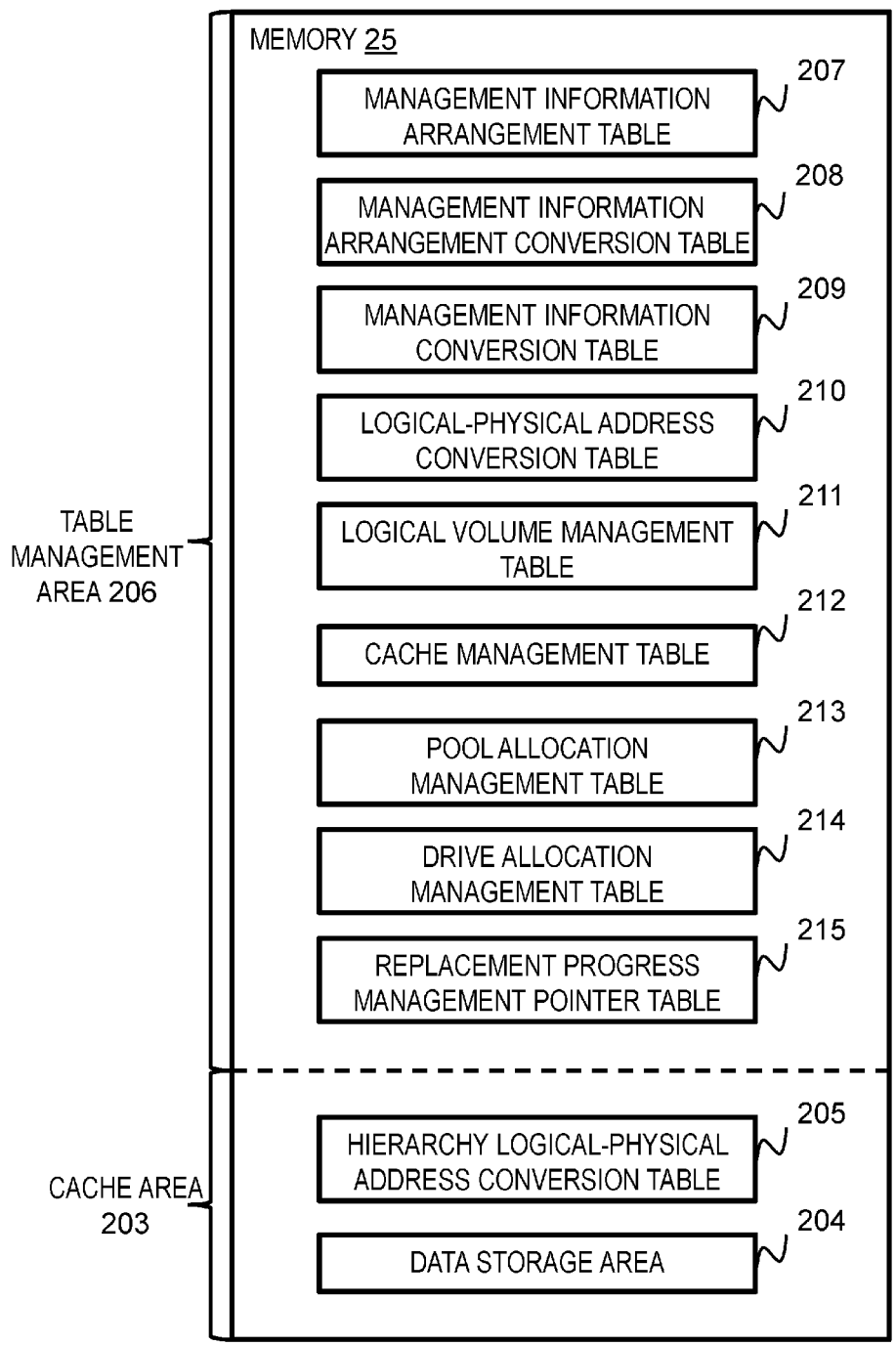
FIG. 3 is a diagram showing a configuration example of a table management area and a cache area in a memory held by the storage device according to the first embodiment of the invention.

FIG. 3 is a diagram showing a configuration example of the table management area 206 and the cache area 203 in the memory 25 held by the storage device 11 according to the first embodiment of the invention.

The cache area 203 in the memory 25 includes a data storage area 204 for temporarily storing write data from the host computer 30 and a hierarchy logical-physical address conversion table 205 for managing a data storage position. The table management area 206 stores a management information arrangement table 207 for managing a memory information arrangement of management information, a management information arrangement conversion table 208 for converting a management information arrangement in the migration destination, a management information conversion table 209 for converting the management information, a logical-physical address conversion table 210 for managing a physical address with respect to a logical address, a logical volume management table 211 for storing information related to a logical volume (VOL), a cache management table 212 for managing cache information in the memory 25, a pool allocation management table 213 for storing information related to a pool, a drive allocation management table 214 for storing information related to a pool allocation, and a replacement progress management pointer table 215 for managing a migration progress of the management information during replacement.

(Management Information Arrangement Table)

FIG. 4 is a diagram showing a configuration example of the management information arrangement table 207 held by the storage device 11 according to the first embodiment of the invention.

The management information arrangement table 207 includes an entry for each type of management information. Each entry stores information such as a management information name 41, a logical memory ID 42, a logical address 43, and a size 44. Hereinafter, one type of management information ("target management information" in FIG. 4) will be described as an example.

The management information name 41 indicates a name of information related to a management state of the storage device 11. The information related to the management state of the storage device 11 constitutes the management information described above (for example, the shared management information X2222X shown in FIG. 1). The information may include security setting information related to security setting of data managed by the target storage device 11, backup control information related to backup control of the data managed by the target storage device 11, charging information related to a contract state of a data effective capacity that can be managed by the target storage device 11, logical-physical address conversion information for managing a storage position of data, and the like. The logical-physical address conversion information will be described later (see the logical-physical address conversion table 210 in FIG. 7 and the hierarchy logical-physical address conversion table 205 in FIG. 12). The logical memory ID 42 indicates an ID of the memory 25 in which the management information is recorded. The logical address 43 and the size 44 indicate how large the management information is recorded in an address of the memory 25.

(Management Information Arrangement Conversion Table)

FIG. 5 is a diagram showing a configuration example of the management information arrangement conversion table 208 held by the storage device 11 according to the first embodiment of the invention.

The management information arrangement conversion table 208 includes conversion information of a storage position and is related to where management information of the migration source storage controller 1_22A and management information of the migration destination storage controller 2_22B are respectively stored in the memory 25. The management information arrangement conversion table 208 includes an entry for each type of management information. Each entry stores information such as a logical memory ID (A) 51, a logical address (A) 52, and a size (A) 53 that are related to management information of the migration source, a logical memory ID (B) 54, a logical address (B) 55, and a size (B) 56 that are related to management information of the migration destination.

(Management Information Conversion Table)

FIG. 6 is a diagram showing a configuration example of the management information conversion table 209 held by the storage device 11 according to the first embodiment of the invention.

The management information conversion table 209 includes information related to a correspondence between the management information of the migration source storage controller 1_22A and the management information of the migration destination storage controller 2_22B.

The management information conversion table 209 has an entry for each type of management information. Each entry stores information related to a correspondence relationship between the management information of the migration source and the management information of the migration destination, including an entry size (A) 62 and an entry size (A) 63 that serve as information of the migration source, and an entry size (B) 64 and entry information (B) 65 that serve as information of a converted migration source.

The processor 24 converts the entry information (A) 63 into the entry information (B) 65, so that management information is shared between the migration source storage controller 1_22A and the migration destination storage controller 2_22B.

(Logical-Physical Address Conversion Table)

FIG. 7 is a diagram showing a configuration example of the logical-physical address conversion table 210 held by the storage device 11 according to the first embodiment of the invention.

The logical-physical address conversion table 210 manages a correspondence among a logical memory ID 71 corresponding to an address specified by the host computer 30, a logical address 72, a storage ID 73 indicating a physical storage position of data written to the logical address 72, a physical memory ID 74, and a physical address 75.

(Logical Volume Management Table)

FIG. 8 is a diagram showing a configuration example of the logical volume management table 211 held by the storage device 11 according to the first embodiment of the invention.

The logical volume management table 211 manages a logical volume ID 81 corresponding to a logical unit, a cache allocation volume 82 that can be allocated to the logical volume, a logical volume address 83 indicating a logical storage position of the logical volume, a cache ID (A) 84 for identifying a cache of the migration source storage controller 1_22A that corresponds to the logical volume, a cache ID (B) 85 for identifying a cache of the migration destination storage controller 2_22B that corresponds to the logical volume, a drive ID 86 for identifying a physical drive in which the logical volume is stored, and a drive address 87 indicating an address of an area where the logical volume is stored in the drive.

(Cache Management Table)

FIG. 9 is a diagram showing a configuration example of the cache management table 212 held by the storage device 11 according to the first embodiment of the invention.

The cache management table 212 is a management table for temporarily storing data in a cache, and manages a cache ID 91 for identifying a cache, a physical memory ID 92 for identifying a physical memory that stores cached data, a physical address 93 indicating an area in the memory, a usage flag 94, a usage starting time point 95 of the area, a final access time point 96, a dirty data flag 97 indicating whether to write data to a drive, a cache hit count 98 of the area, and the like.

(Pool Allocation Management Table)

FIG. 10 is a diagram showing a configuration example of the pool allocation management table 213 held by the storage device 11 according to the first embodiment of the invention.

The pool allocation management table 213 manages a VOL_ID 101 for identifying a logical volume, a VOL attribute 102 indicating an attribute of the logical volume, a VOL capacity 103 indicating a capacity of the logical volume, a pool ID 104 for identifying a pool allocated to the logical volume, a RAID group ID 105 for identifying a RAID group allocated to the pool, and the like.

(Drive Allocation Management Table)

FIG. 11 is a diagram showing a configuration example of the drive allocation management table 214 held by the storage device 11 according to the first embodiment of the invention.

The drive allocation management table 214 includes an entry for each RAID group. Each entry stores information including a RAID group ID 111, a RAID level 112, a drive ID 113, a drive type 114, a capacity 115, and a used capacity 116.

The RAID group ID 111 is an ID for identifying a RAID group. The RAID level 112 indicates a type of a RAID algorithm applied to the RAID group. The drive ID 113 is an ID for identifying each of one or more drives constituting the RAID group. The drive type 114 indicates a type of a drive (for example, an HDD or an SSD) that constitutes the RAID group. The capacity 115 indicates a capacity of the RAID group. The used capacity 116 indicates a capacity being used of the capacity of the RAID group.

(Hierarchy Logical-Physical Address Conversion Table)

FIG. 12 is a diagram showing a configuration example of the hierarchy logical-physical address conversion table 205 held by the storage device 11 according to the first embodiment of the invention.

The hierarchy logical-physical address conversion table 205 has the same function as the logical-physical address conversion table 210. For the logical-physical address conversion table 210 stored in the table management area 206, since table information can be stored in a cache area having a large capacity or a drive, a large table can be managed. Logical-physical address mapping information of a compression valid VOL is managed in the first embodiment.

Specifically, the hierarchy logical-physical address conversion table 205 manages a logical memory ID 121, a logical address 122, a difference bit 123, a physical memory ID 124, a physical address 125, and a size 126. Among them, the logical memory ID 121, the logical address 122, the physical memory ID 124, and the physical address 125 are respectively the same as the logical memory ID 71, the logical address 72, the physical memory ID 74, and the physical address 75 in the logical-physical address conversion table 210.

The difference bit 123 is a bit used for a flag indicating that data is updated by writing I/O to the storage controller 2_22B. The size 126 indicates a size of data (for example, when the data is compressed, the size 126 indicates an actual size of the data after compression) written in an area specified by the physical memory ID 74 and the physical address 75.

(Replacement Progress Management Pointer Table)

FIG. 13 is a diagram showing a configuration example of the replacement progress management pointer table 215 held by the storage device 11 according to the first embodiment of the invention.

The replacement progress management pointer table 215 manages a migration progress for management information to be migrated between the storage controllers 22 during replacement. Information such as a management information name 151, a logical address head 152 of management information, a size 153, and a progress pointer 154 are managed as progress information. For each piece of management information identified by the management information name 151, these pieces of information indicate completion of a migration of information in a range up to an address indicated by the progress pointer 154 among information in a range specified by the logical address head 152 and the size 153.

Ina replacement processing, each of the migration source and the migration destination manages the replacement progress management pointer table 215, and the processing is switched in accordance with a progress.

(Logical Storage Hierarchy)

Figure 14:
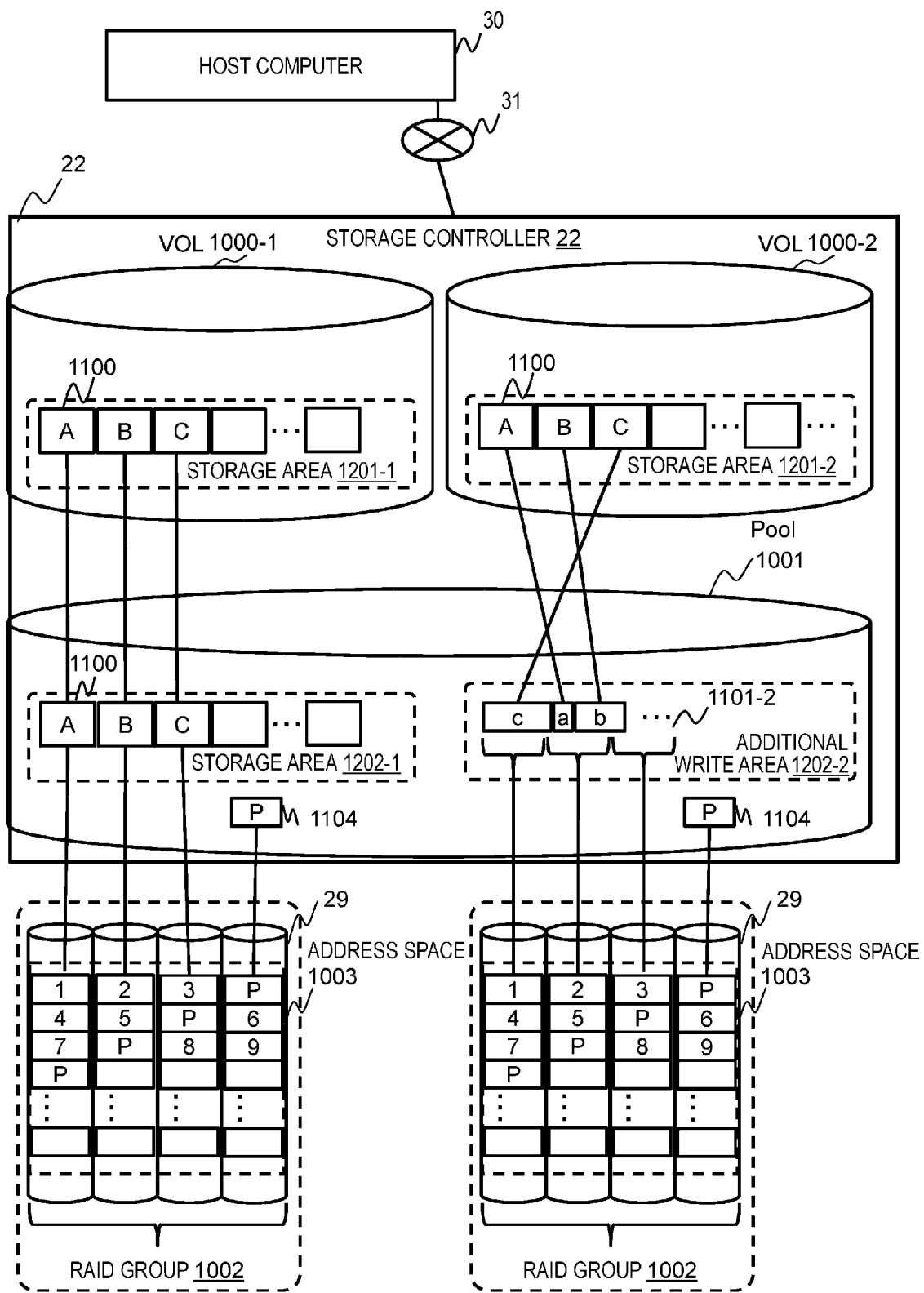
FIG. 14 is a diagram showing a configuration example of a logical storage hierarchy managed by the storage device according to the first embodiment of the invention.

FIG. 14 is a diagram showing a configuration example of a logical storage hierarchy managed by the storage device 11 according to the first embodiment of the invention.

A VOL 1000 is provided to the host computer 30. An allocation from the VOL 1000 to a pool 1001 is managed based on the pool allocation management table 213. An allocation from the pool 1001 to a drive address space 1003 (that is, a plurality of drive address spaces provided by a plurality of drives 29 constituting a RAID group 1002) is managed based on the drive allocation management table 214.

Depending on a copying processing or a deduplication processing, one pool address may be referred to from a plurality of management units (slots) of logical data in the VOL 1000, and may also be referred to by a plurality of slots of the VOL. Data to be stored may be reduced to a size corresponding to a compression rate by a compression processing. The example in FIG. 14 shows an additional write area 1202-2 in which compressed data is additionally written. A correspondence between storage areas 1201 in the VOL 1000 and a storage area 1202-1 and the additional write area 1202-2 in the Pool 1001 is managed based on the logical-physical address conversion table 210 or the hierarchy logical-physical address conversion table 205.

Hereinafter, examples of processings executed according to the present embodiment will be described.

(Replacement Processing (Migration Source))

Figure 15:
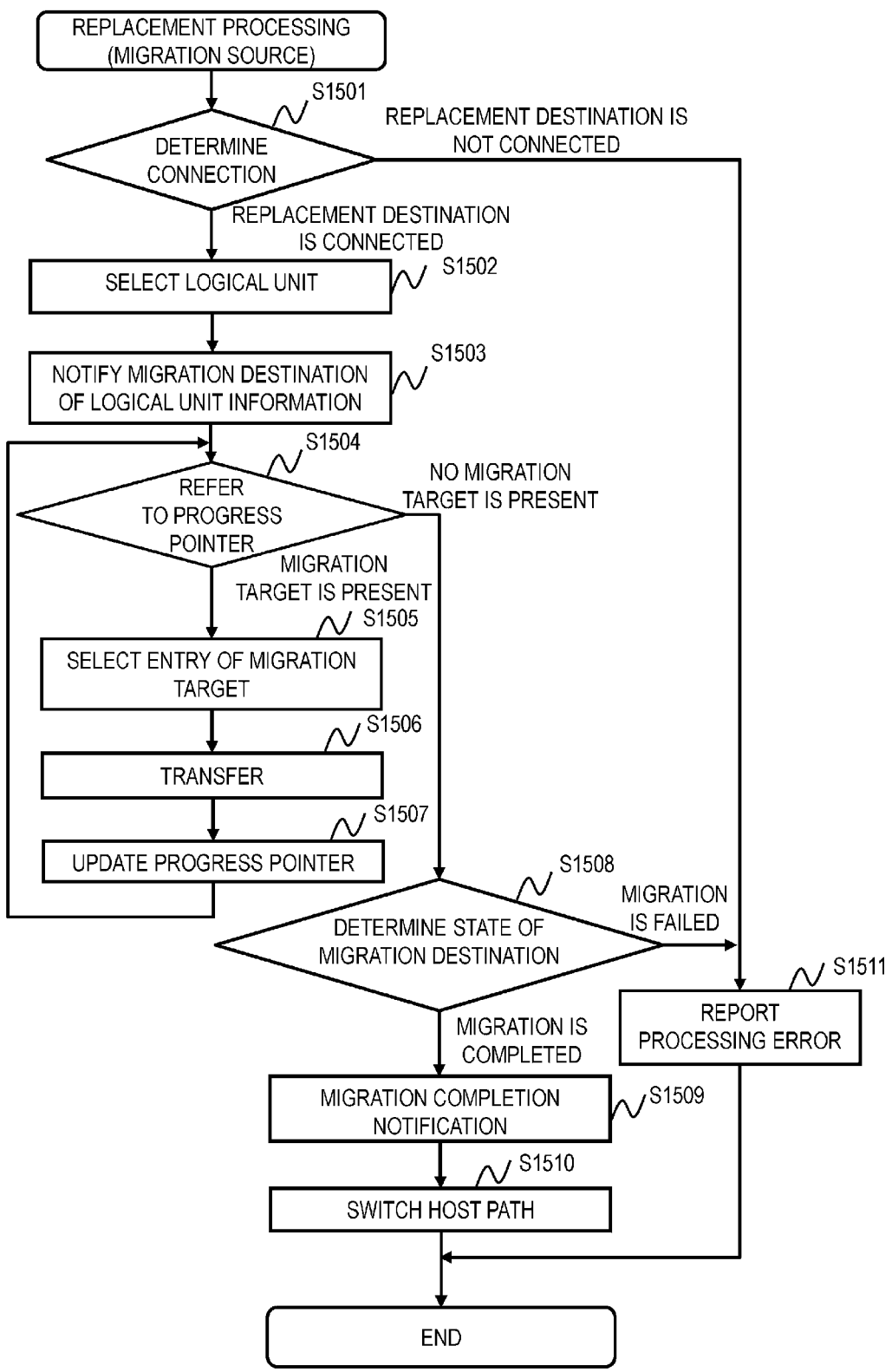
FIG. 15 is a flowchart showing a replacement processing of a migration source storage controller when the replacement processing is executed from one storage device to another storage device in the storage system according to the first embodiment of the invention.

FIG. 15 is a flowchart showing a replacement processing of the migration source storage controller 1_22A when the replacement processing is executed from the storage device 11A to the storage device 11B in the storage system 100 according to the first embodiment of the invention.

A series of flows of the replacement processing are shown in S1501 to S1511.

Here, a case will be described in which the storage controller 1_22A is replaced with the storage controller 2_22B, that is, the storage controller 1_22A is the migration source and the storage controller 2_22B is the migration destination as shown in FIG. 1. The same applies to FIGS. 16 to 20.

The processing in FIG. 15 is executed by the processor 24 of the migration source storage controller 1_22A. When a replacement instruction is received from a user, in S1501, the processor 24 determines whether the storage controller 22 serving as a replacement destination (that is, the migration destination storage controller 2_22B) is connected. For example, as shown in S1 in FIG. 1, when the storage device 11B including the migration destination storage controller 2_22B is connected to the storage controller 1_22A serving as a migration source, the host computer 30, and the drive 29 via the network 31, it is determined in S1501 that the storage controller 2_22B serving as the replacement destination is connected, and the processing proceeds to S1502.

In S1502, the processor 24 selects a logical unit. In S1503, the processor 24 starts a migration for copying the shared management information X2222X related to the selected logical unit to the migration destination storage controller 2_22B.

In S1504, the processor 24 refers to the progress pointer 154 in the replacement progress management pointer table 215 held by the storage controller 1_22A, and determines the presence or absence of a migration target. For example, when a transfer of any one piece of management information is not completed based on the progress pointer 154, it is determined in S1504 that the migration target is present, and the processing proceeds to S1505.

In S1505, the processor 24 selects an entry of the migration target. For example, when a migration of the logical-physical address conversion table 210 is not completed, the processor 24 may refer to the progress pointer 154 corresponding to the logical-physical address conversion table 210, identify a value of a logical address that is not migrated yet, and select, as the migration target, an entry in the logical-physical address conversion table 210 in which the logical address 72 has the value.

In S1506, the processor 24 transfers the entry selected as the migration target to the migration destination storage controller 2_22B. Then, in S1507, the processor 24 updates the progress pointer 154 so as to reflect the transfer described above. Then, the processing returns to S1504.

When transfers for all pieces of management information (for example, all pieces of the shared management information X2222X) are completed, it is determined in S1504 that no migration target is present, and the processing proceeds to S1508. In S1508, the processor 24 determines a state of the migration destination. For example, the migration destination storage controller 2_22B reports a processing error when information updated based on the entry transferred in S1506 is failed (see FIG. 16). When such a processing error is received, the processor 24 of the storage controller 1_22A may determine that the migration is failed. When such a processing error is not received, the processor 24 may determine that the migration is completed.

When it is determined in S1508 that the migration is completed, the processor 24 transmits a migration completion notification to the migration destination storage controller 2_22B in S1509, and invalidates (invalidates a host path) a FE_I/F 23A of the migration source storage controller 1_22A in S1510.

When it is determined in S1501 that the storage controller 2_22B serving as the replacement destination is not connected or when it is determined in S1508 that the migration is failed, the processor 24 transmits a processing error notification to the migration destination storage controller 2_22B in S1511, and ends the processing.

(Replacement Processing (Migration Destination))

Figure 16:
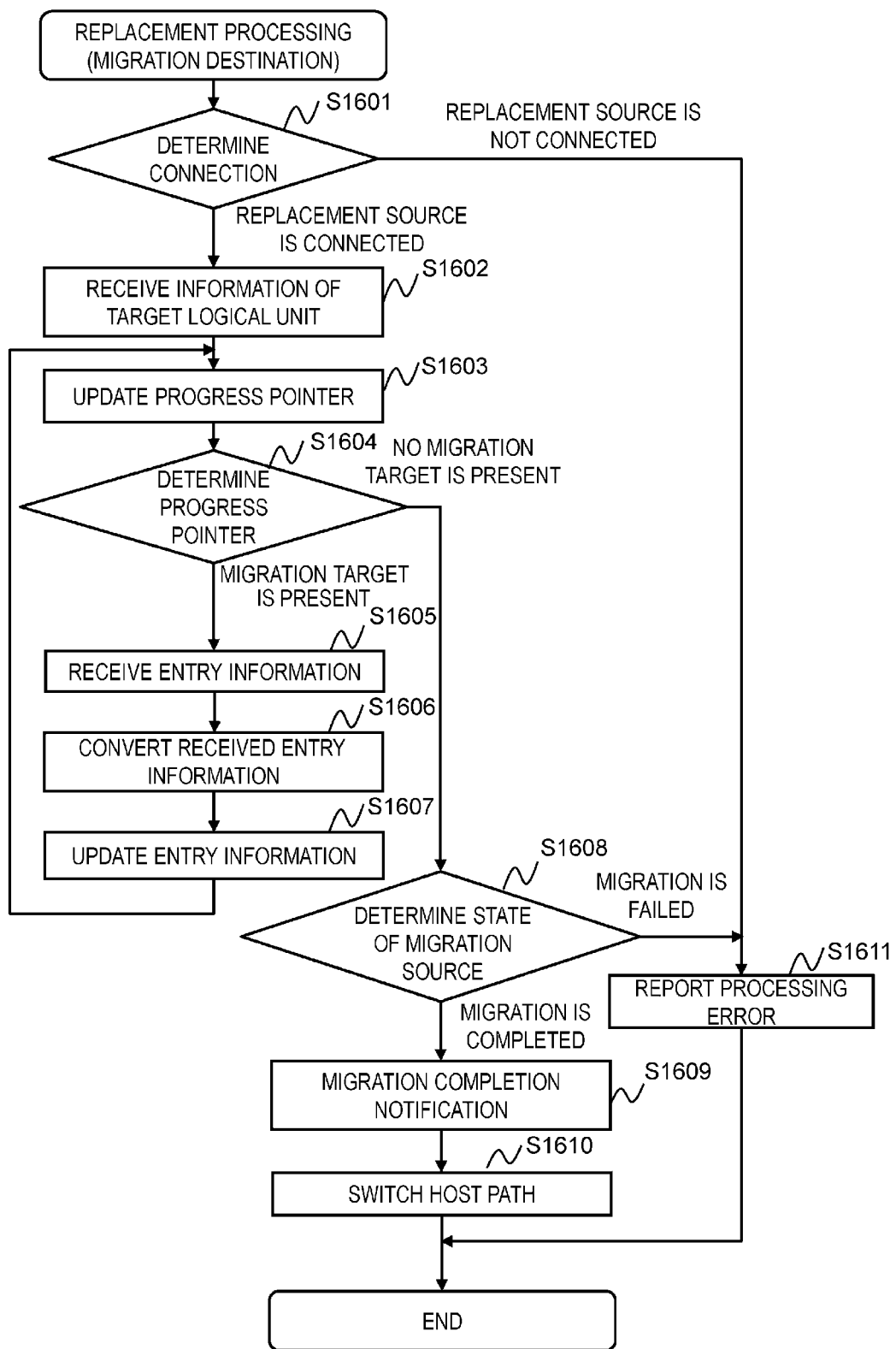
FIG. 16 is a flowchart showing a replacement processing of a migration destination storage controller when the replacement processing is executed from one storage device to another storage device in the storage system according to the first embodiment of the invention.

FIG. 16 is a flowchart showing a replacement processing of the migration destination storage controller 2_22B when the replacement processing is executed from the storage device 11A to the storage device 11B in the storage system 100 according to the first embodiment of the invention.

A series of flows of the replacement processing are shown in S1601 to S1611.

The processing in FIG. 16 is executed by the processor 24 of the migration destination storage controller 2_22B. In S1601, the processor 24 of the storage controller 2_22B determines whether the storage controller 22 serving as a replacement source (the migration source storage controller 1_22A in the present embodiment) is connected. When it is determined that the migration source storage controller 1_22A is connected, the processing proceeds to S1602.

In S1602, the processor 24 receives shared management information related to a logical unit of a migration target. The shared management information is transmitted from the migration source storage controller 1_22A in S1503 in FIG. 15.

In S1603, the processor 24 updates the progress pointer 154 in the replacement progress management pointer table 215 held by the storage controller 2_22B.

In S1604, the processor 24 refers to the progress pointer 154 and determines the presence or absence of a migration target. This determination may be executed in the same manner as S1504 in FIG. 15 so as to advance the progress pointer 154 when, for example, the replacement progress management pointer table is received from the storage controller 2_22B and management information is received.

When it is determined in S1604 that the migration target is present, the processor 24 receives entry information in S1605. The entry information is transferred from the migration source storage controller 1_22A in S1506 in FIG. 15.

In S1605, the processor 24 converts the received entry information. Specifically, the processor 24 refers to the management information arrangement conversion table 208 and the management information conversion table 209, and converts an arrangement and content of the storage controller 1_22A in management information included in the received entry information into an arrangement and content of the storage controller 2_22B.

In S1606, the processor 24 updates entry information (for example, information corresponding to a corresponding entry in the shared management information Y2222Y) according to the converted arrangement and content. Thereafter, the processing returns to S1603. In S1603, the progress pointer 154 is updated so as to reflect the update of the entry information.

When it is determined in S1604 that no migration target is present, the processor 24 determines a state of the migration source in S1608. For example, when the processor 24 receives the processing error notification transmitted in S1511 in FIG. 15 from the migration source storage controller 1_22A, the processor 24 may determine that the migration is failed. When the processing error notification is not received, the processor 24 may determine that the migration is completed.

When it is determined in S1608 that the migration is completed, the processor 24 transmits a migration completion notification to the migration source storage controller 1_22A in S1609, switches a host path by validating a FE_I/F 23B of the migration destination storage controller 2_22B in S1610, and ends the processing.

When it is determined in S1601 that the storage controller 1_22A serving as the replacement source is not connected or when it is determined in S1608 that the migration is failed, the processor 24 transmits a processing error notification to the migration source storage controller 1_22A in S1611, and ends the processing.

(Read Processing (Migration Source))

Figure 17:
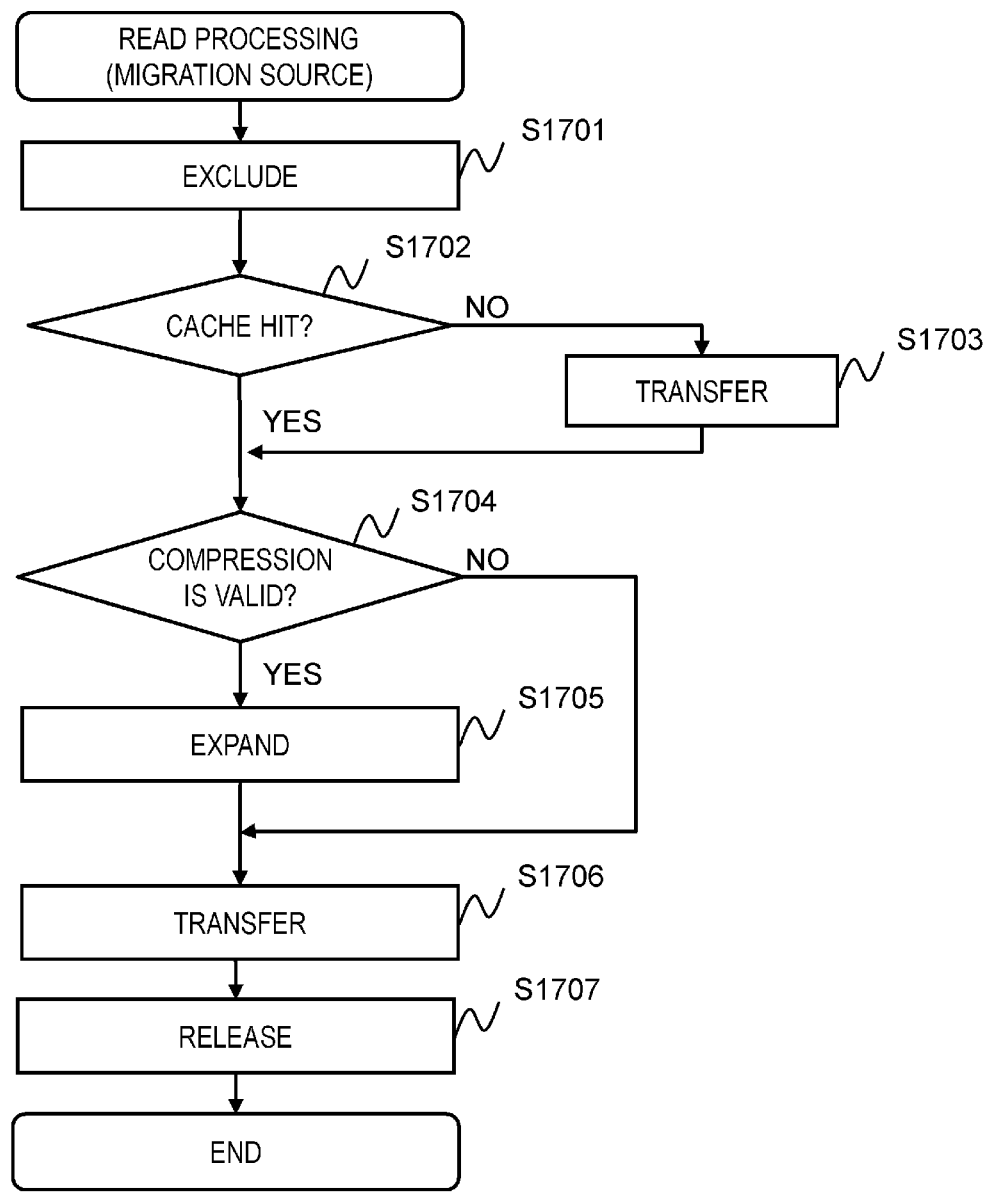
FIG. 17 is a flowchart showing a read I/O processing from a host computer to a storage device in the storage system according to the first embodiment of the invention.

FIG. 17 is a flowchart showing a read I/O processing from the host computer 30 to the storage device 11A in the storage system 100 according to the first embodiment of the invention.

A series of flows of the read processing are shown in S1701 to S1707.

The read processing is started when the storage device 11A receives a read command from the host computer 30 via the network 31. A virtual ID (for example, a virtual VOL_ID), an address, a data size, and the like are specified in the read command.

The processing in FIG. 17 is executed by the processor 24 of the migration source storage controller 1_22A. In S1701, the processor 24 ensures exclusiveness of a slot specified in the read command. When exclusiveness of a slot is ensured in other processings during ensuring the exclusiveness of a slot, the processor 24 waits for a certain period and then executes S1701.

In S1702, the processor 24 determines whether read data is present in the cache area 203. When a determination result of S1702 is true, the processing proceeds to S1704. When the determination result of S1702 is false, the processor 24 transfers read data from a RAID group to the buffer area 202 in S1703. At this time, the processor 24 specifies the VOL attribute 102 from a VOL_ID and a logical address specified by the host computer 30 by referring to the pool allocation management table 213. When the VOL attribute is compression valid, the processor 24 pulls the logical address specified by the host computer 30 from the logical address 122 in the hierarchy logical-physical address conversion table 205 that manages compressed data, and reads data having the size 126 from the physical address 125 corresponding to the logical address 122. When the VOL attribute is a normal VOL or the like, the processor 24 specifies a physical address 75 indicating a data storage position from the logical address 72 in the corresponding logical-physical address conversion table 210, and reads data having a fixed length.

In S1704, the processor 24 determines whether the read data in the buffer area 202 is compressed based on the VOL attribute 102. When the data is compressed data, the processor 24 expands the data in S1705. When the data is not compressed data, the processor 24 skips S1705.

In S1706, the processor 24 transfers the read data in the buffer area 202 to the host computer 30. At the time of completing the data transfer in S1706, the host computer 30 recognizes that the read processing is ended.

Thereafter, in S1707, the processor 24 releases the ensured exclusiveness of the slot. After S1707 is completed, the processor 24 ends the read processing.

(Write Processing (Migration Source))

Figure 18:
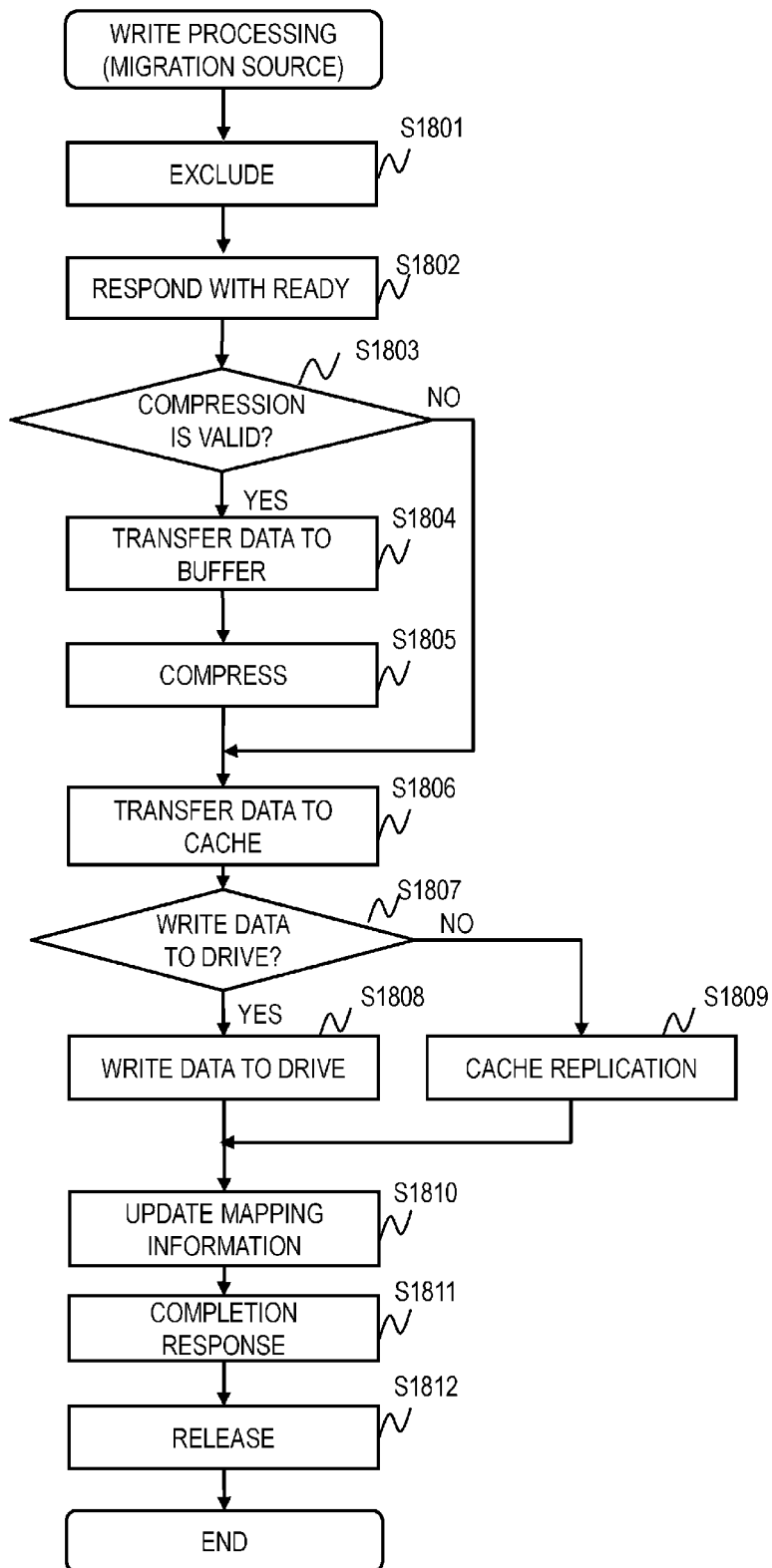
FIG. 18 is a flowchart showing a write I/O processing from the host computer to a storage device in the storage system according to the first embodiment of the invention.

FIG. 18 is a flowchart showing a write I/O processing from the host computer 30 to the storage device 11A in the storage system 100 according to the first embodiment of the invention.

A series of flows of the write processing are shown in S1801 to S1812.

The write processing is started when the storage device 11A receives a write command from the host computer 30. In the following description of FIG. 18, for example, the storage controller 1_22A1 and the storage controller 1_22A2 are described to distinguish a plurality of storage controllers 22 belonging to the storage device 11A. Components belonging to the storage controller 1_22A1 and the storage controller 1_22A2 are distinguished by being respectively denoted with reference numbers "A1" and "A2". For example, processors 24 respectively belonging to the storage controller 1_22A1 and the storage controller 1_22A2 are described as a processor 24A1 and a processor 24A2.

The write command from the host computer 30 is accompanied by an allocation destination address. In S1801, the storage device 11A ensures exclusiveness of a slot indicated by the allocation destination address. At the same time with ensuring the exclusiveness of the slot, the processor 24A1 allocates a slot area of the cache area 203A to which data is to be written.

In S1802, the processor 24A1 responds to the host computer 30 with "Ready" indicating that the write processing is ready. The processor 24A1 receives write data from the host computer 30 that receives "Ready".

In S1803, the processor 24A1 determines whether an allocation destination of the received write data is compression valid. The determination is made by referring to the logical volume 83 in the logical volume management table 211 and referring to the VOL attribute 102 corresponding to the VOL_ID 101 in the pool allocation management table 213 based on the corresponding logical volume ID 81. When compression is valid, the processor 24A1 stores the write data in the buffer area 202 in S1804, and compresses the write data in S1805. The processor 24A1 stores compressed data or uncompressed write data in the cache area 203 in S1806.

Next, in S1807, the processor 24A1 determines whether the above-described replacement processing is in execution by referring to the progress pointer 154 in the replacement progress management pointer table 215. When the replacement processing is in execution, since the write data cannot be reflected in the migration destination, the processor 24A1 executes a destage processing and writes the write data to the drive 29 in S1808. When the replacement processing is completed (that is, when a migration of management information is completed), in S1809, the processor 24A1 executes replication for data of the storage controller 1_22A1 and data of the storage controller 1_22A2 in the storage device 11A and also transfers data to a cache on a storage controller of the storage device 11B which is the migration destination.

When data writing to the drive 29 (S1808) is completed, or when a data transfer to the storage device 11B is completed and cache replication between two storage controllers 22 in the migration source storage device 11A (S1809) is completed, the processor 24A1 updates data mapping information in S1810. For the compressed data, an allocation destination address specified by the host computer 30 is registered in the logical address 122 in the hierarchy logical-physical address conversion table 205, and the size 126 after compression and the storage destination physical address 125 are registered. For the uncompressed data, the physical address 75 corresponding to the logical address 72 in the logical-physical address conversion table 210 is registered.

When the update of the mapping information in S1810 is completed, the processor 24A1 responds to the host computer 30 with write I/O completion in S1811. Finally, in S1812, the exclusiveness of the slot ensured in S1801 is released. When the replacement processing is in execution, the updated mapping information needs to be transferred to the migration destination storage controller 2_22B. Therefore, when an updated part of the mapping information has been transferred, an updated difference is transferred. When the mapping information is not transferred, updated mapping information is transferred. Thereafter, a cache is subject to a destage processing, the write data is written to the drive 29, and the processing is ended.

(Read Processing (Migration Destination))

Figure 19:
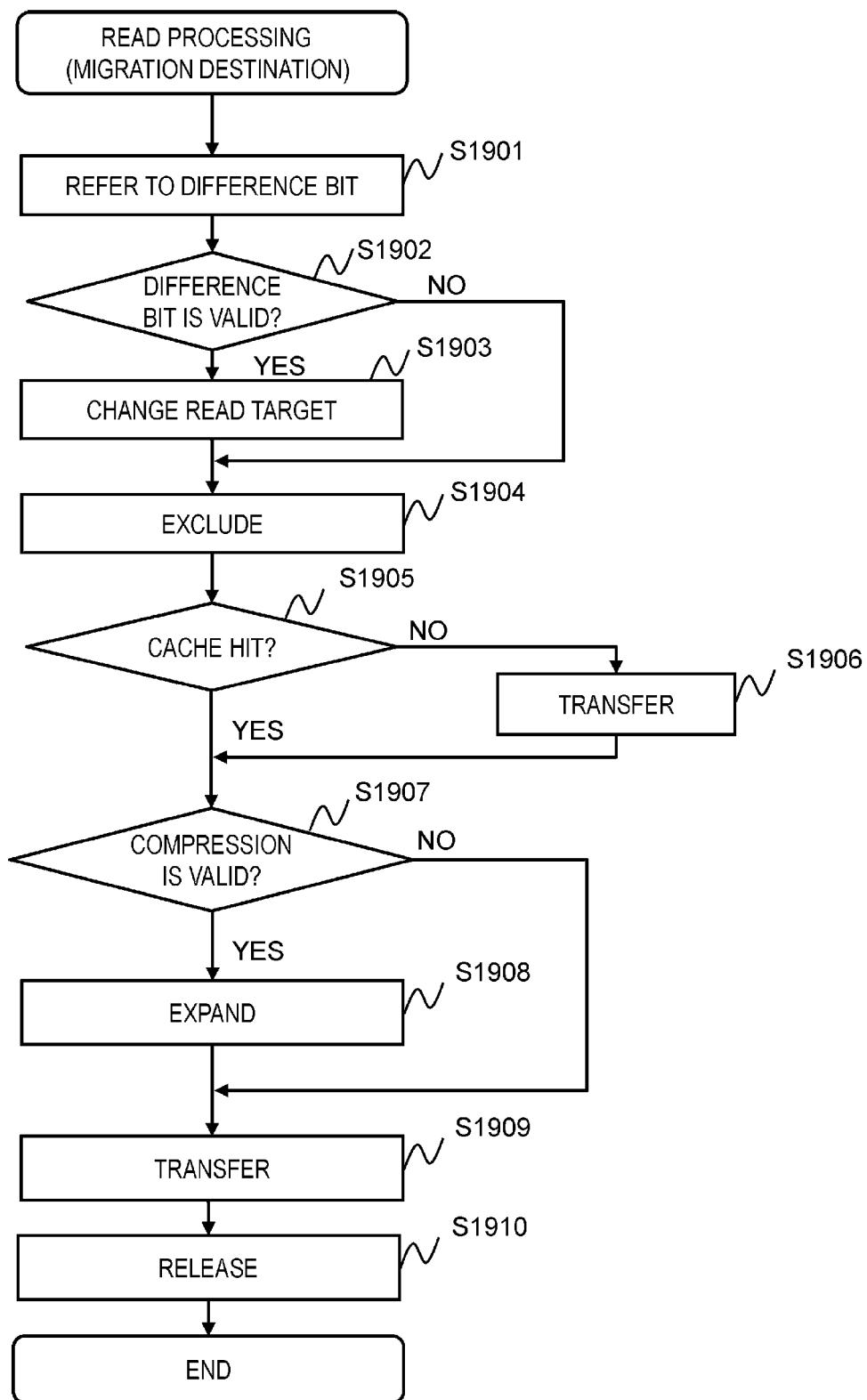
FIG. 19 is a flowchart showing a read I/O processing from the host computer to a storage device in the storage system according to the first embodiment of the invention.

FIG. 19 is a flowchart showing a read I/O processing from the host computer 30 to the storage device 11B in the storage system 100 according to the first embodiment of the invention.

A series of flows of the read processing are shown in S1901 to S1910.

In the read processing of the migration destination, a data read processing is changed according to the VOL attribute 102 in the pool allocation management table 213. FIG. 19 shows an operation when the VOL attribute 102 is compression valid (difference management).

In S1901, the processor 24 of the storage controller 2_22B of the migration destination storage device 11B refers to the difference bit 123 in the hierarchy logical-physical address conversion table 205. When the difference bit 123 is 0, the physical address 125 indicates data shared with the migration source storage device 11A. When the difference bit 123 is 1, the physical address 125 indicates data uniquely managed by the storage device 11B. When data is uniquely managed by the storage device 11B, a data format of the storage device 11B is different from that of the migration source.

In the example of the hierarchy logical-physical address conversion table 205 in FIG. 12, a value of the difference bit 123 in a first entry is "0". The first entry indicates that 8 KB data written in an area starting from a physical address "0x5000" in a physical memory "3" corresponding to a logical address "0xF0001000" in a logical memory "1" is not updated in the migration destination storage device 11B. On the other hand, a value of the difference bit 123 in a third entry is "1". The third entry indicates that 1 KB data written in an area starting from a physical address "0x8000" in a physical memory "2" corresponding to a logical address "0xF0008000" in a logical memory "1" is updated in the migration destination storage device 11B.

In S1902, the processor 24 determines whether the difference bit 123 is valid ("1" in the example in FIG. 12). When the difference bit 123 is valid, in S1903, the processor 24 switches the processings in S1904 to S1910 to processings in accordance with a data format of the migration destination storage device 11B. On the other hand, when the difference bit 123 is invalid, the processor 24 skips S1903 and executes the read processing in accordance with a data format of the migration source storage device 11A.

Since processings in S1904 to S1909 are the same as processings in S1701 to S1706 in FIG. 17 executed by the processor 24 of the migration destination storage controller 2_22B, description thereof will be omitted.

In S1910, the processor 24 determines that data whose value of the difference bit 123 is 0 is "Necessary" to be dirty, and dirty data whose value of the difference bit 123 is 1 is "Not necessary" to be dirty. This is because the data whose value of the difference bit 123 is 1 is stored in the data format of the storage device 11B by the storage controller 2_22B, while as for the data whose value of the difference bit 123 is 0, the storage controller 1_22A takes over data stored in the data format of the storage device 11A. When the data is "Necessary" to be dirty, in S1910, the processor 24 replicates and stores read data in the buffer area 202 into the cache area 203 of a storage controller 2_22B1 and the cache area 203 of a storage controller 2_22B2 in the storage device 11B, and updates the dirty data flag 97 in the cache management table 212 to "ON". The processor 24 stores, asynchronously with an I/O processing, data whose dirty data flag 97 is "ON" into an area unique to the storage device 11B in the data format of the storage device 11B, and updates the value of the difference bit 123 to 1. The unique area may be a storage position determined between the storage device 11A and the storage device 11B, or may be the unique drive 29 that can be accessed only by the storage device 11B.

Thereafter, in S1912, the processor 24 releases the ensured exclusiveness of the slot. After S1912 is completed, the processor 24 ends the read processing.

(Write Processing (Migration Destination))

Figure 20:
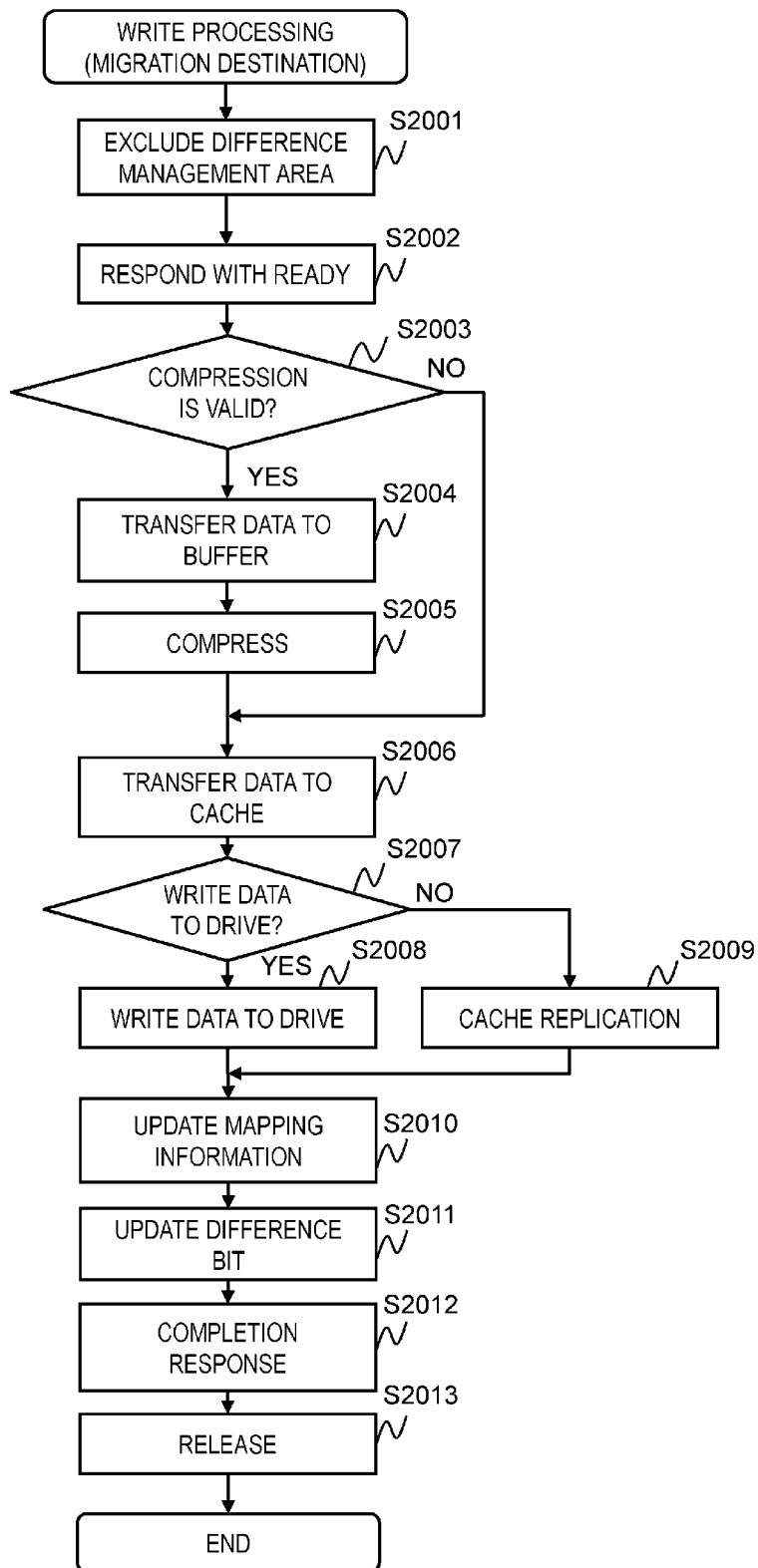
FIG. 20 is a flowchart showing a write I/O processing from the host computer to a storage device in the storage system according to the first embodiment of the invention.

FIG. 20 is a flowchart showing a write I/O processing from the host computer 30 to the storage device 11B in the storage system 100 according to the first embodiment of the invention.

A series of flows of the write processing are shown in S2001 to S2013. The processing is executed by the processor 24 of the storage controller 2_22B of the migration destination storage device 11B, and is the same as the processing in FIG. 18 executed by the processor 24 of the storage controller 1_22A of the migration source storage device 11A except for differences to be described below. Specifically, S1801 is replaced with S2001. S2202 to S2010 correspond to S1802 to S1810, and S2012 and S2013 correspond to S1811 and S1812, respectively. S2011 is inserted between S2010 and S2012.

FIG. 20 shows an operation when the VOL attribute 102 is compression valid (difference management) similarly to the read processing (migration destination) shown in FIG. 19. When the difference management is valid, in the write processing to the storage device 11B, write data is stored in an area unique to the storage device 11B. The unique area may be a storage position determined between the storage device 11A and the storage device 11B, or may be the unique drive 29 that can be accessed only by the storage device 11B.

In S2001, the processor 24 excludes a difference management area (that is, the unique area) in addition to the exclusiveness the same as the exclusiveness in S1801.

In S2007, the processor 24 determines whether a migration of the management information is completed based on the progress pointer 154 in the replacement progress management pointer table 215. When the migration is completed, the processor 24 proceeds to S2009 and replicates and stores data in caches of the storage controller 2_22B1 and the storage controller 2_22B2 in the storage device 11B. When the migration is not completed, the processor 24 executes writing into a drive in S2008.

In S2010, a processor 24B1 updates data mapping information. For information related to the update, update difference information relative to mapping information before the update is created as management information in the unique area. When data written in the unique area is accessed (read according to a read request or an updated write request), a physical address is calculated and accessed by using copied management information and the update difference information serving as the management information in the unique area.

For compressed data, an allocation destination address specified by the host computer 30 is registered in the logical address 122 in the hierarchy logical-physical address conversion table 205, and the size 126 after compression and the storage destination physical address 125 are registered. For uncompressed data, the physical address 75 corresponding to the logical address 72 in the logical-physical address conversion table 210 is registered.

When the update of the mapping information is completed in S2010, in S2011, the processor 24 updates the difference bit 123 to "1" so as to indicate that the update is stored in the data format of the storage device 11B by the above-described write processing. An initial value of the difference bit 123 is 0.

In S2012, the processor 24B1 sends write I/O completion to the host computer 30. Finally, in S2013, the exclusiveness of the slot ensured in S2001 is released. Thereafter, a cache is subject to a destage processing, write data is written to the drive 29, and the processing is ended.

By the processings described above, a non-disruptive migration can be performed between storages having different data management forms while sharing an external storage medium between the storages, replacement can be performed at a cycle suitable for each of a storage controller and a storage medium that constitute a storage device, and a period when performance is influenced accompanying with the replacement can be shortened.

Second Embodiment

Hereinafter, a second embodiment of the invention will be described. Since each unit of a system according to the second embodiment has the same function as each unit denoted by the same reference number according to the first embodiment except for differences to be described later, description thereof will be omitted.

(Write Through)

Figure 21:
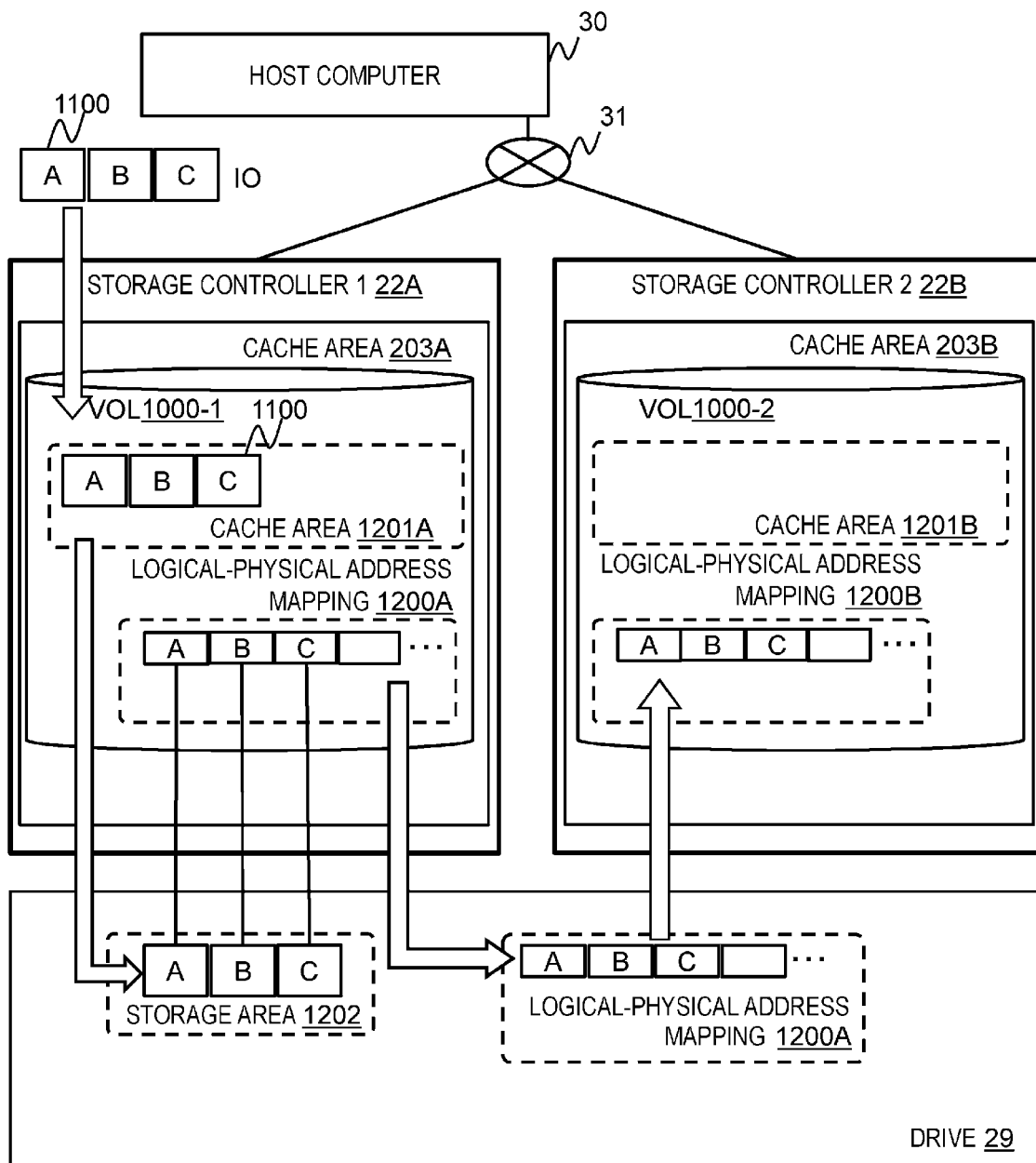
FIG. 21 is a diagram showing a replacement procedure between storage devices having different data management forms, which is executed by a storage system according to a second embodiment of the invention.

FIG. 21 is a diagram showing a replacement procedure between storage devices having different data management forms, which is executed by the storage system 100 according to the second embodiment of the invention.

Different from a method for switching between writing to the drive 29 and data replication between the storage controllers 22 according to the first embodiment of the invention, all of data or management information, exclusiveness information, and the like are reflected in the drive 29 in synchronization with I/O according to the second embodiment. Since all of the data or the management information, and the exclusiveness information can be shared by referring to the drive 29, the storage controllers 22 that share the drive 29 are operated by converting management information read from the drive 29 into individual data management forms.

For example, a case will be described in which the storage controller 1_22A is replaced with the storage controller 2_22B in the same manner as the first embodiment. Among shared management information, the processor 24 of the migration source storage controller 1_22A stores at least a logical-physical address mapping 1200A (for example, the hierarchy logical-physical address conversion table 205) of shared management information in the cache area 203A and also in the drive 29. When the logical-physical address mapping 1200A or the like in the cache area 203A is updated, the processor 24 also reflects the update of the logical-physical address mapping 1200A or the like in the drive 29.

Thereafter, when the replacement processing (FIGS. 15 and 16) from the storage controller 1_22A to the storage controller 2_22B is started, the processor 24 of the migration source storage controller 1_22A transfers, of the shared management information, those that are not stored in the drive 29 to the migration destination storage controller 2_22B as in S1504 to S1507 in FIG. 15. For example, when only the hierarchy logical-physical address conversion table 205 in the shared management information is stored in the drive 29, information other than the hierarchy logical-physical address conversion table 205 is transferred to the migration destination storage controller 2_22B.

The processor 24 of the migration destination storage controller 2_22B converts the shared management information transferred from the migration source storage controller 1_22A according to the management information arrangement conversion table 208 and the management information conversion table 209, and stores the shared management information in the cache area 203B as in S1602 to S1607 in FIG. 16. On the other hand, the processor 24 of the migration destination storage controller 2_22B reads the shared management information stored in the drive 29 from the drive 29, converts the shared management information according to the management information arrangement conversion table 208 and the management information conversion table 209, and stores the shared management information in the cache area 203B. For example, when the logical-physical address mapping 1200A is read from the drive 29, the logical-physical address mapping 1200A is converted into a logical-physical address mapping 1200B and the converted logical-physical address mapping 1200B is stored in the cache area 203B.

Accordingly, it is not necessary to transfer at least the logical-physical address mapping 1200A from the migration source storage controller 1_22A to the migration destination storage controller 2_22B after the replacement processing is started. In general, since a data volume of a logical-physical address mapping (for example, the hierarchy logical-physical address conversion table 205) occupies most of a data volume of shared management information, time required for the replacement processing is greatly shortened according to the second embodiment.

Third Embodiment

Hereinafter, a third embodiment of the invention will be described. Since each unit of a system according to the third embodiment has the same function as each unit denoted by the same reference number according to the first or the second embodiment except for differences to be described later, description thereof will be omitted.

(Management Information Migration from Externally Connected Storage)

Figure 22:
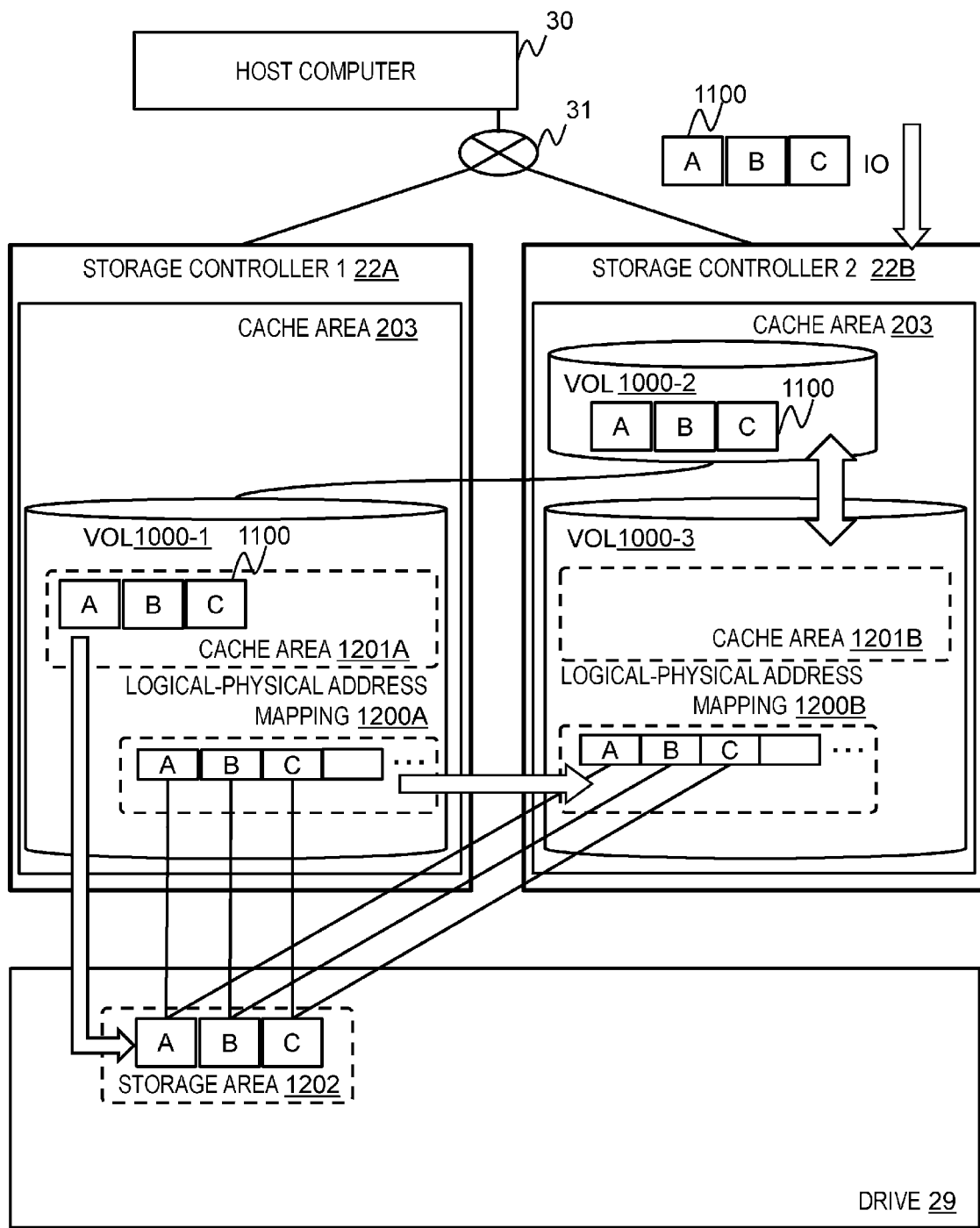
FIG. 22 is a diagram showing a replacement procedure between storage devices having different data management forms, which is executed by a storage system according to a third embodiment of the invention.

FIG. 22 is a diagram showing a replacement procedure between storage devices having different data management forms, which is executed by the storage system 100 according to the third embodiment of the invention.

In the third embodiment, an externally connected storage similar to a storage disclosed in Patent Literature 1 is used. A migration is implemented by sharing management information between a VOL 1000-3 serving as a data migration destination in a migration destination storage controller and a VOL 1000-1 serving as a migration source by the same write through as the write through in the second embodiment.

For example, a case will be described in which the storage controller 1_22A is replaced with the storage controller 2_22B in the same manner as the first embodiment.

When the migration destination storage controller 2_22B is connected to the host computer 30 and the drive 29, a migration of shared management information is executed in the same manner as the first embodiment (FIGS. 15 and 16). Different from the first embodiment, a target of host I/O is switched from the migration source storage controller 1_22A to the migration destination storage controller 2_22B without waiting for completion of a processing in which the shared management information is converted and stored in the migration destination storage controller 2_22B in the third embodiment. Thereafter, I/O (read and write) is executed from the host computer 30 to the migration destination storage controller 2_22B.

When the processor 24 of the migration destination storage controller 2_22B receives the I/O from the host computer 30 from when the target is switched up to when the migration of the shared management information is completed, the processor 24 transfers the I/O to the migration source storage controller 1_22A. The processor 24 of the migration source storage controller 1_22A processes the I/O received from the migration destination storage controller 2_22B and responses to the migration destination storage controller 2_22B. For example, when writing is executed, a write result is returned to the migration destination storage controller 2_22B, and when reading is executed, read data is returned to the migration destination storage controller 2_22B. The processor 24 of the migration destination storage controller 2_22B transfers received response to the host computer 30.

Accordingly, when the migration destination storage controller 2_22B is connected to the host computer 30, an I/O target can be immediately switched.

The embodiments of the invention described above may include the following examples. That is, a storage system includes a storage medium, one or more storage controllers connected to the storage medium, and one or more host computers connected to the storage controllers. An additional storage controller having a different hardware configuration and a different data management form is connected to the one or more storage controllers. In addition to the storage controllers, the additional storage controller is connected to the storage medium and the host computer. When the additional storage controller and the storage controllers are connected, one or more logical units or all logical units managed by the storage controllers and serving as a replacement target specified by a management operation are specified. Data management information of the replacement target specified by the management operation is transmitted from the storage controllers to the additional storage controller. The additional storage controller that receives the data management information can access data provided in the logical units serving as the replacement target by converting a data management form of the data management information. After the additional storage controller converts the data management form, the additional storage controller validates a path between the storage medium and the host computer, and accesses data such as host I/O and a configuration change. Among the storage controllers that transmit the data management information of the logical units, a storage controller is replaced by removing the storage controller at any timing after the path is validated by the additional storage controller. Data is protected and an I/O performance during the replacement processing is maintained by switching a processing in which data is written into a drive in synchronization with the host I/O and a processing in which data is replicated in cache areas of the storage controllers and the additional storage controller in accordance with a migration progress of the data management information by the additional storage controller.

The embodiments of the invention may further include the following examples.

(1) A storage system includes a storage control unit provided with a processor (for example, the processor 24) and a memory (for example, the memory 25), and a storage drive (for example, the drive 29) provided with a storage medium that stores data. The storage control unit includes data management information (for example, the shared management information X2222X and Y2222Y) for accessing data stored in the storage drive. The storage control unit includes a first storage control unit (for example, the storage controller 1_22A) and a second storage control unit (for example, the storage controller 2_22B). The first storage control unit and the second storage control unit are connected to a host computer (for example, the host computer 30) and the storage drive. The first storage control unit copies data management information about the data stored in the storage drive from the first storage control unit to the second storage control unit (for example, S1506 and S1607). When the storage control unit receives a write request from the host after copying of the data management information is started, each of the first storage control unit and the second storage control unit stores write data related to the write request in a separate storage area of the storage drive (for example, S1808 and S2008).

Accordingly, a non-disruptive migration can be executed between storage devices while an external storage medium is shared between the storage devices, replacement can be executed at a cycle suitable for each of the storage controller and the storage medium that constitute a storage device, and a performance influence accompanying with the replacement can be prevented. Even when data is updated during the replacement processing, the update can be reflected in the drive.

(2) According to the above-described (1), each of the first storage control unit and the second storage control unit creates data management information for accessing stored data.

(3) According to the above-described (2), the first storage control unit updates the data management information when writing is executed during the copying, and the second storage control unit creates update difference information for the data management information when writing is executed during the copying.

(4) According to the above-described (3), the first storage control unit accesses data written after the copying using the updated data management information, and the second storage control unit accesses the data written after the copying using the copied data management information and the update difference information.

(5) According to the above-described (1), the first storage control unit uses a first data format, the second storage control unit uses a second data format, and the second storage control unit coverts the copied data management information (for example, S1606) so that the second storage control unit using the second data format can access data stored in the storage drive in the first data format.

(6) According to the above-described (5), after the copying is started, the first storage control unit stores write data using the first data format, and the second storage control unit stores write data using the second data format.

(7) According to the above-described (6), the second storage control unit converts data stored in the storage drive in the first data format into data in the second data format and stores the converted data in the storage drive.

(8) According to the above-described (7), the first storage control unit sets a host path before the copying is started, the second storage control unit changes the host path after the copying is completed (for example, S1510 and S1610), and the data format conversion is executed after the host path is changed.

(9) According to the above-described (8), the second storage control unit reads and transfers data that is received based on a read request and is stored in the first data format (for example, S1909), and converts and stores the data in the second data format (for example, storages executed asynchronously after S1910).

(10) According to the above-described (1), the first storage control unit sets a host path before the copying is started, and the second storage control unit changes the host path after the copying is completed (for example, S1510 and S1610).

(11) According to the above-described (10), the second storage control unit is added before the copying, and the first storage control unit is removed after the host path is changed.

(12) A storage system includes a storage control unit provided with a processor (for example, the processor 24) and a memory (for example, the memory 25), and a storage drive (for example, the drive 29) provided with a storage medium that stores data. The storage control unit includes data management information (for example, the shared management information X2222X and Y2222Y) for accessing data stored in the storage drive. The storage control unit includes a first storage control unit (for example, the storage controller 1_22A) and a second storage control unit (for example, the storage controller 2_22B). The first storage control unit and the second storage control unit are connected to a host computer (for example, the host computer 30) and the storage drive. The first storage control unit uses a first data format, and the second storage control unit uses a second data format. The first storage control unit copies data management information about the data stored in the storage drive from the first storage control unit to the second storage control unit (for example, S1506 and S1607). The second storage control unit converts the copied data management information (for example, S1606) so that the second storage control unit using the second data format can access data stored in the storage drive in the first data format.

Accordingly, a non-disruptive migration can be executed between storage devices while an external storage medium is shared among between the storage devices, replacement can be executed at a cycle suitable for each of the storage controllers and the storage medium that constitute a storage device, and a performance influence accompanying with the replacement can be prevented. The second storage control unit using the second data format can access the data stored in the storage drive in the first data format.

The invention is not limited to the embodiments described above and includes various modifications. Although an example of replacement is described, a storage system in which two storage devices coexist may be provided as long as a migration is executed between the storage devices while a storage medium is shared between the storage devices. For example, the embodiments described above are described in detail for better understanding of the invention. The invention is not necessarily limited to embodiments including all configurations described above. A part of configurations of one embodiment can be replaced with configurations of another embodiment. Alternatively, configurations of an embodiment can be added to configurations of another embodiment. A part of configurations of the embodiments can be omitted, or be added or replaced with other configurations.

A part or all of configurations, functions, processing units, processing methods, and the like described above may be implemented by hardware such as through design using an integrated circuit. The configurations, functions, and the like described above may also be implemented by software by a processor interpreting and executing a program for implementing functions. Information such as a program, a table, or a file for implementing the functions may be stored in a storage device such as a non-volatile semiconductor memory, a hard disk drive, and a solid state drive (SSD), or a computer readable non-transitory data storage medium such as an IC card, an SD card, and a DVD.

Control lines and information lines show those considered to be necessary for description, and not all of the control lines or the information lines are necessarily shown on a product. In practice, it may be considered that almost all of the configurations are connected to each other.

What is claimed is:

1. A storage system comprising:
a storage control unit including a processor and a memory; and
a storage drive including a storage medium that stores data, wherein:
the storage control unit includes data management information for accessing data stored in the storage drive,
the storage control unit includes a first storage control unit and a second storage control unit,
the first storage control unit and the second storage control unit are connected to a host and the storage drive,
the first storage control unit uses a first data format,
the second storage control unit uses a second data format,
when the storage control unit that controls data input and output changes from the first storage control unit to the second storage control unit,
the storage control unit converts the data management information so that the second storage control unit using the second data format accesses the data storage in the storage drive in the first data format, and
when the storage control unit receives a write request from the host while the data management information is being converted, each of the first storage control unit and the second storage control unit stores write data related to the write request in a separate storage area of the storage drive in the format used by each storage control unit.

2. The storage system according to claim 1, wherein
each of the first storage control unit and the second storage control unit creates data management information for accessing the stored data.

3. The storage system according to claim 2, wherein
the first storage control unit copies the data management information about the data stored in the storage drive from the first storage control unit to the second storage control unit,
the first storage control unit updates the data management information when writing is executed during the copying, and
the second storage control unit creates update difference information for the data management information when writing is executed during the copying.

4. The storage system according to claim 3, wherein
the first storage control unit accesses data written after the copying using the updated data management information, and
the second storage control unit accesses data written after the copying using the copied data management information and the update difference information.

5. The storage system according to claim 1, wherein
the second storage control unit converts the copied data management information so that the second storage control unit using the second data format accesses the data stored in the storage drive in the first data format.

6. The storage system according to claim 5, wherein
after the copying is started, the first storage control unit stores write data using the first data format, and the second storage control unit stores write data using the second data format.

7. The storage system according to claim 6, wherein
the first storage control unit sets a host path before the copying is started,
the second storage control unit changes the host path after the copying is completed, and
the data format conversion is executed after the host path is changed.

8. The storage system according to claim 7, wherein
the second storage control unit reads and transfers data that is received based on a read request and is stored in the first data format, and converts and stores the data in the second data format.

9. The storage system according to claim 1, wherein
the first storage control unit sets a host path before the copying is started, and
the second storage control unit changes the host path after the copying is completed.

10. The storage system according to claim 9, wherein
the second storage control unit is added before the copying, and
the first storage control unit is removed after the host path is changed.

11. A storage system comprising:
a storage control unit including a processor and a memory; and
a storage drive including a storage medium that stores data, wherein
the storage control unit includes data management information for accessing data stored in the storage drive,
the storage control unit includes a first storage control unit and a second storage control unit,
the first storage control unit and the second storage control unit are connected to a host and the storage drive,
the first storage control unit uses a first data format, the second storage control unit uses a second data format, the storage control unit converts the copied data management information so that the second storage control unit using the second data format accesses the data stored in the storage drive in the first data format.

12. A control method for a storage system including a storage control unit provided with a processor and a memory, and a storage drive provided with a storage medium that stores data, wherein the storage control unit includes data management information for accessing data stored in the storage drive, the storage control unit includes a first storage control unit and a second storage control unit, the first storage control unit and the second storage control unit are connected to a host and the storage drive, the first storage control unit uses a first data format, the second storage control unit uses a second data format, and the control method comprising:

converting, by the storage control unit, the data management information so that the second storage control unit using the second data format accesses the data stored in the storage drive in the first data format when the storage control unit that controls data input and output changes from the first storage control unit to the second storage control unit, and storing, by each of the first storage control unit and the second storage control unit, write data related to a write request in a separate storage area of the storage drive in the format used by each storage control unit when the storage control unit receives the write request from the host while the data management information is being converted.

* * * * *